Figure 3B:
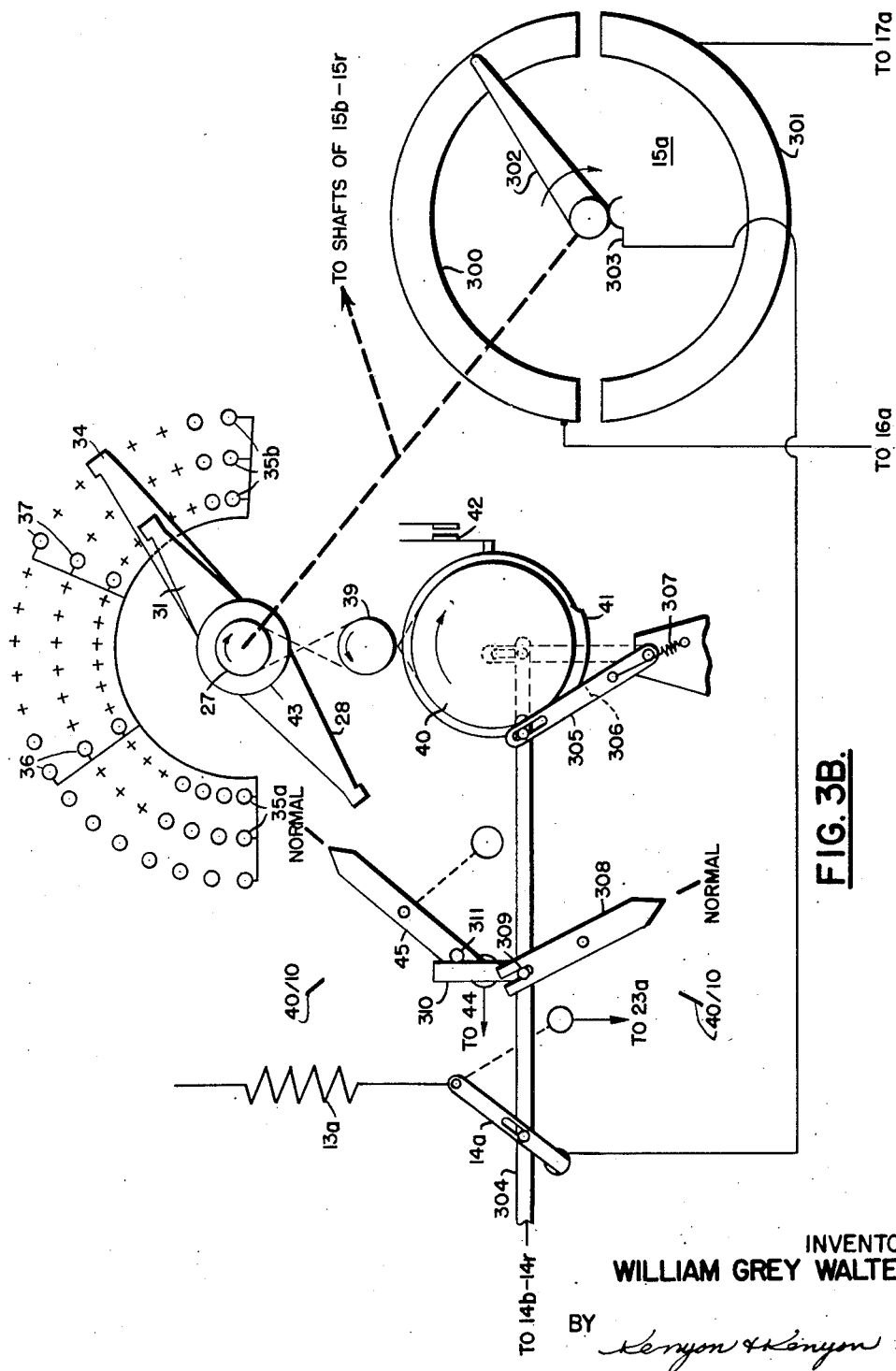

Aug. 11, 1953      W. G. WALTER      2,648,822
WAVE FORM ANALYSING APPARATUS
Filed Aug. 6, 1947      10 Sheets-Sheet 1
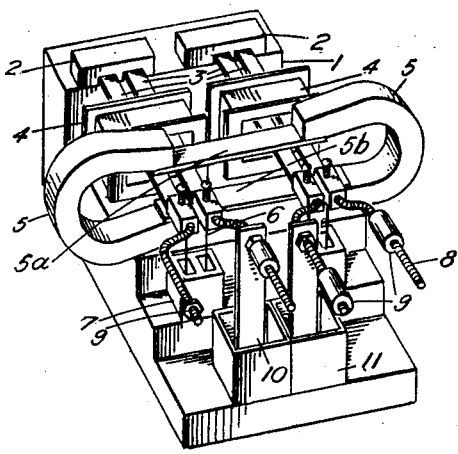
FIG. 1.
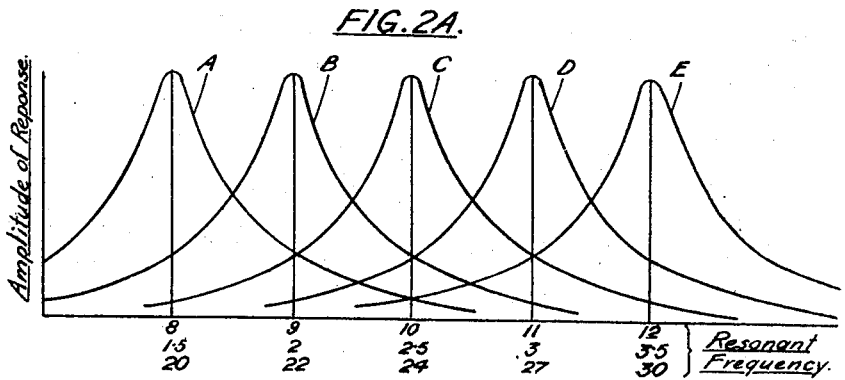
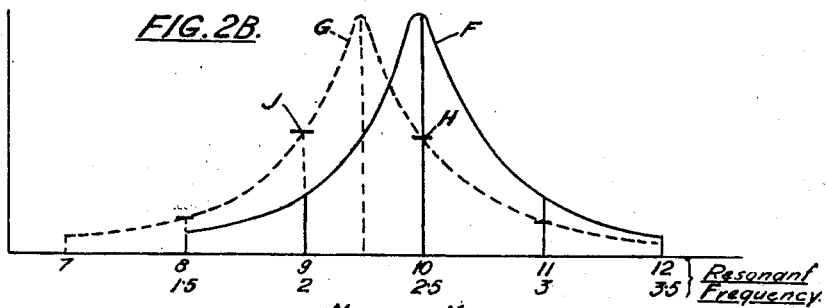
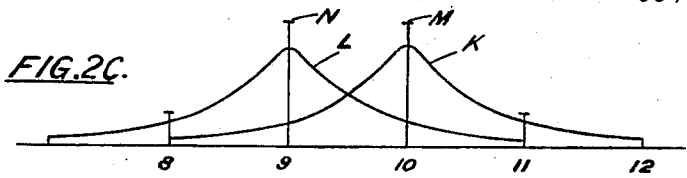
INVENTOR
WILLIAM GREY WALTER
BY Kenyon & Kenyon
ATTORNEYS

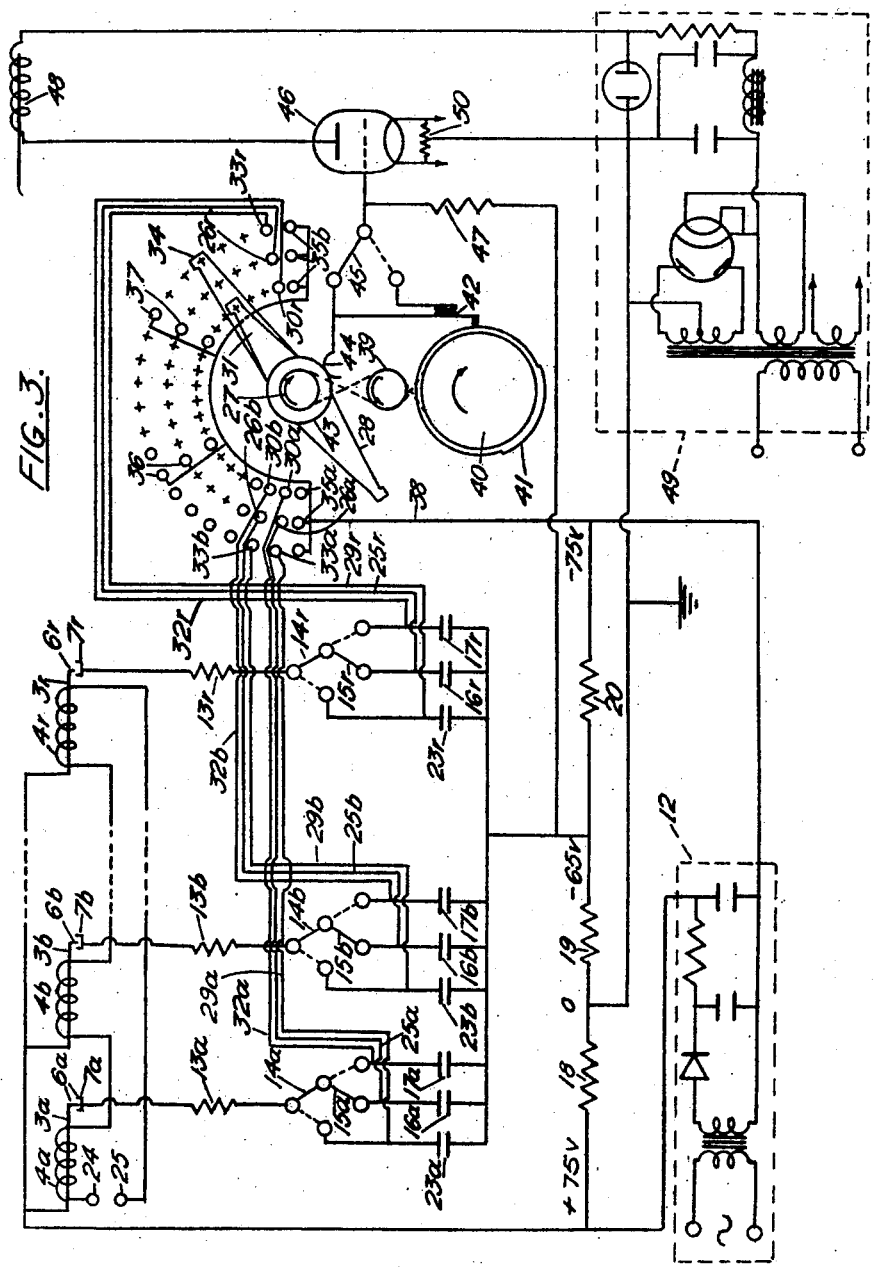

Aug. 11, 1953  W. G. WALTER  2,648,822
WAVE FORM ANALYSING APPARATUS
Filed Aug. 6, 1947  10 Sheets-Sheet 4
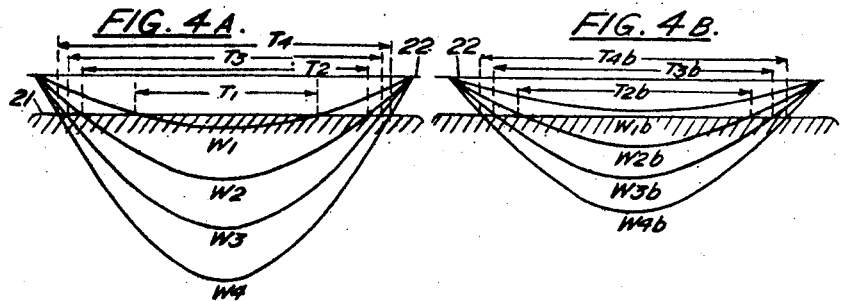
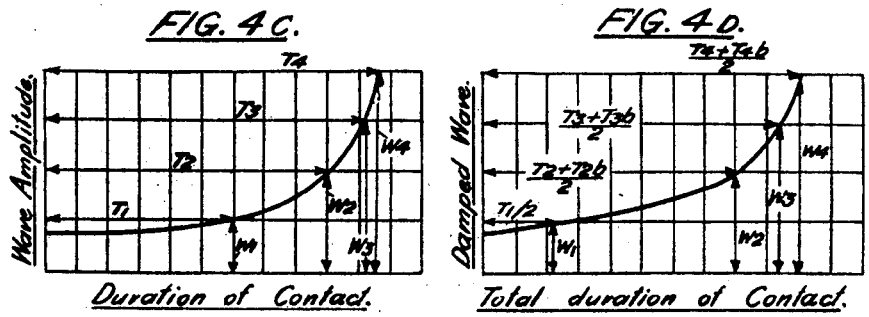
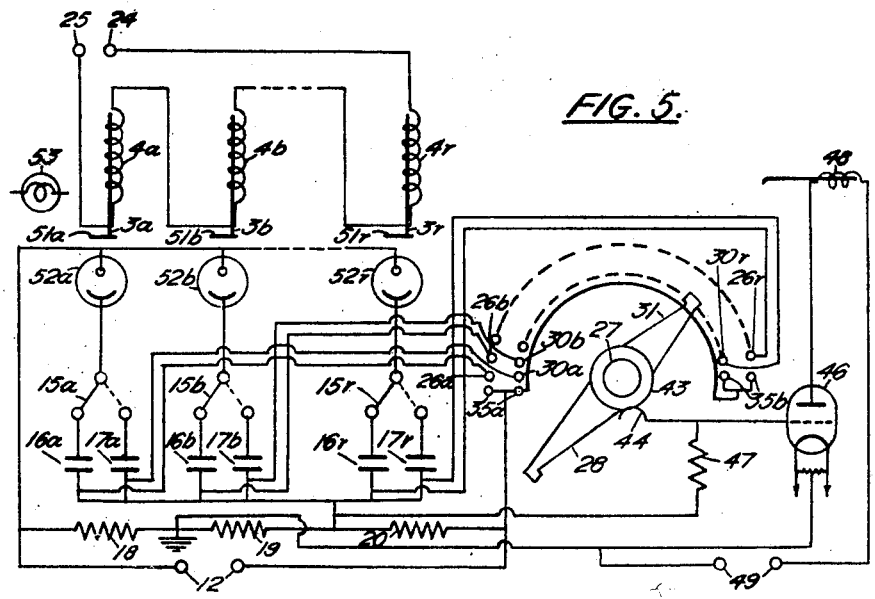
INVENTOR
WILLIAM GREY WALTER
BY Kenyon & Kenyon
ATTORNEYS Aug. 11, 1953 W. G. WALTER 2,648,822
WAVE FORM ANALYSING APPARATUS
Filed Aug. 6, 1947 10 Sheets-Sheet 5
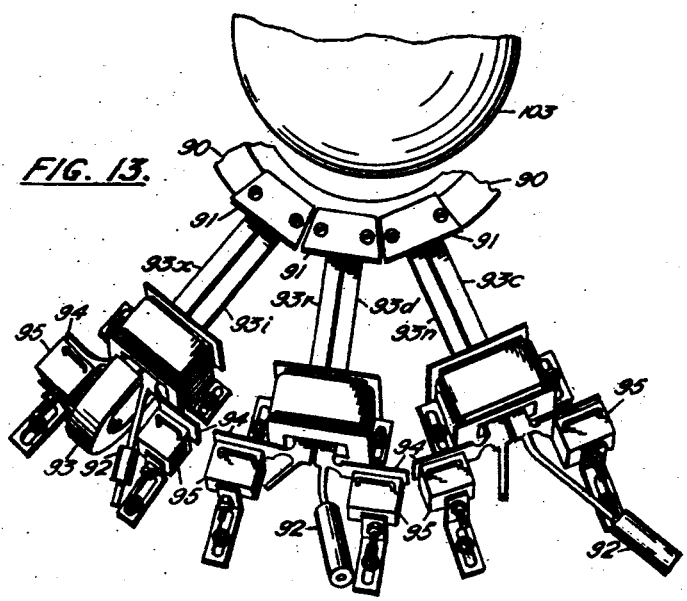
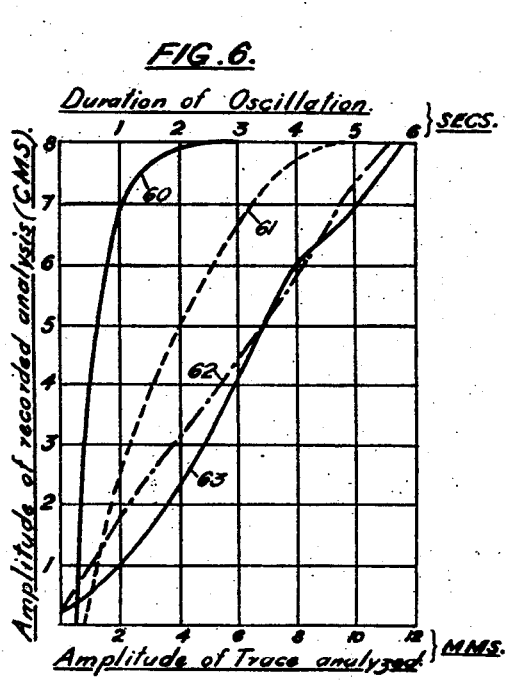
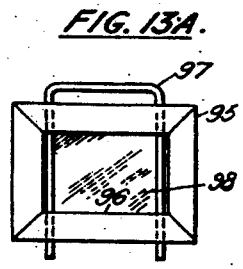
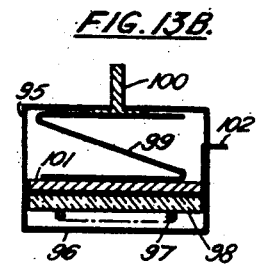
INVENTOR
WILLIAM GREY WALTER
BY Kenyon & Kenyon
ATTORNEYS

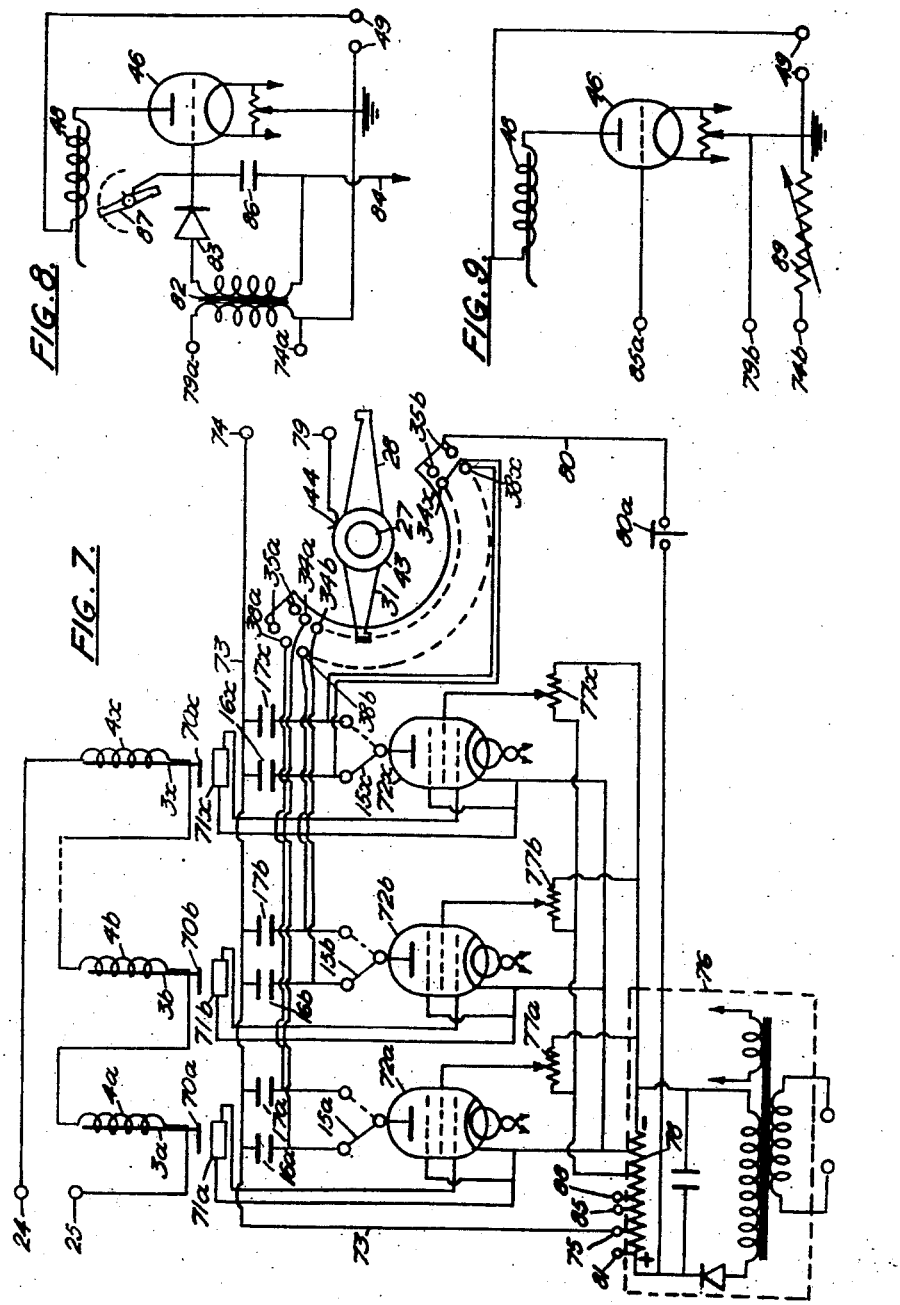

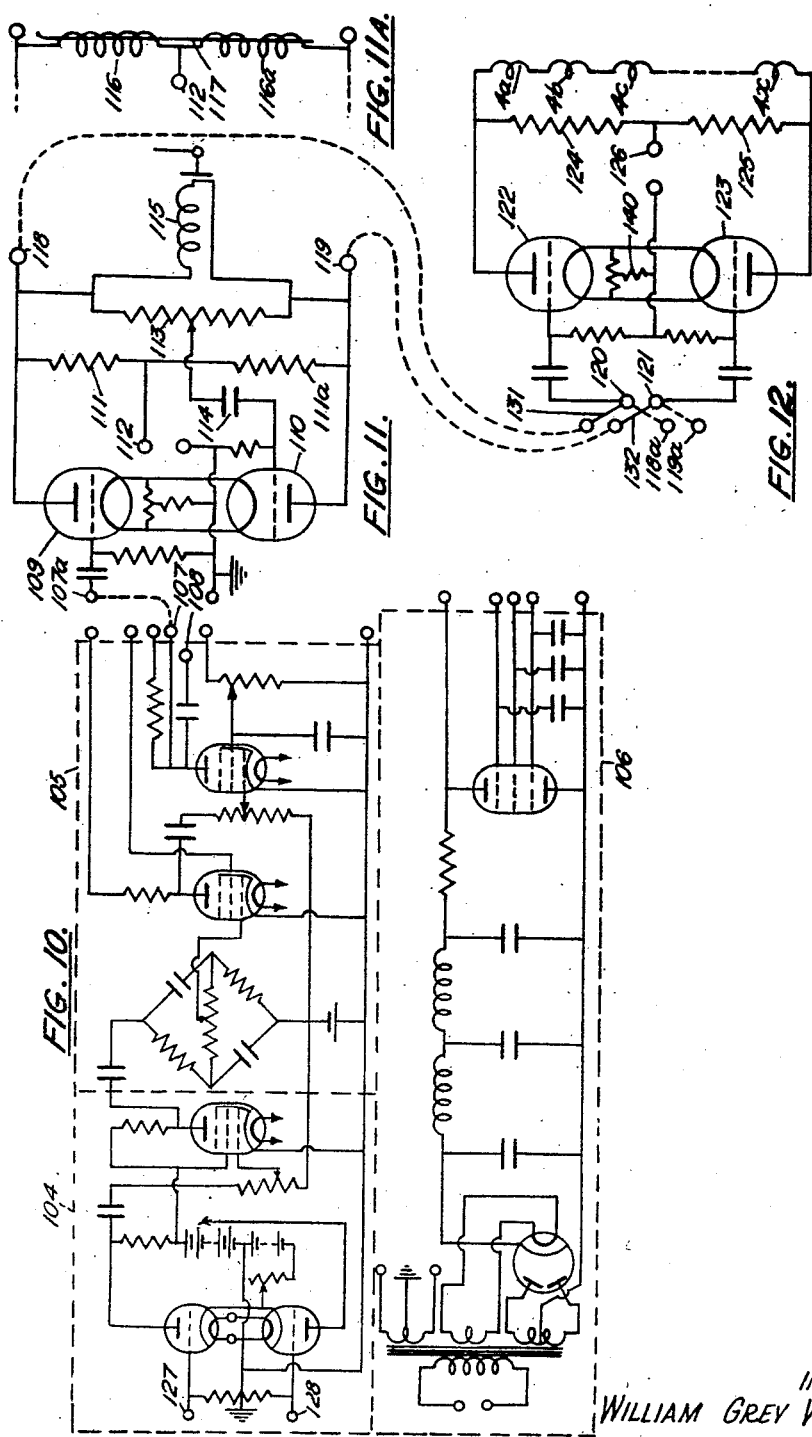

Aug. 11, 1953  W. G. WALTER  2,648,822
WAVE FORM ANALYSING APPARATUS
Filed Aug. 6, 1947  10 Sheets-Sheet 8
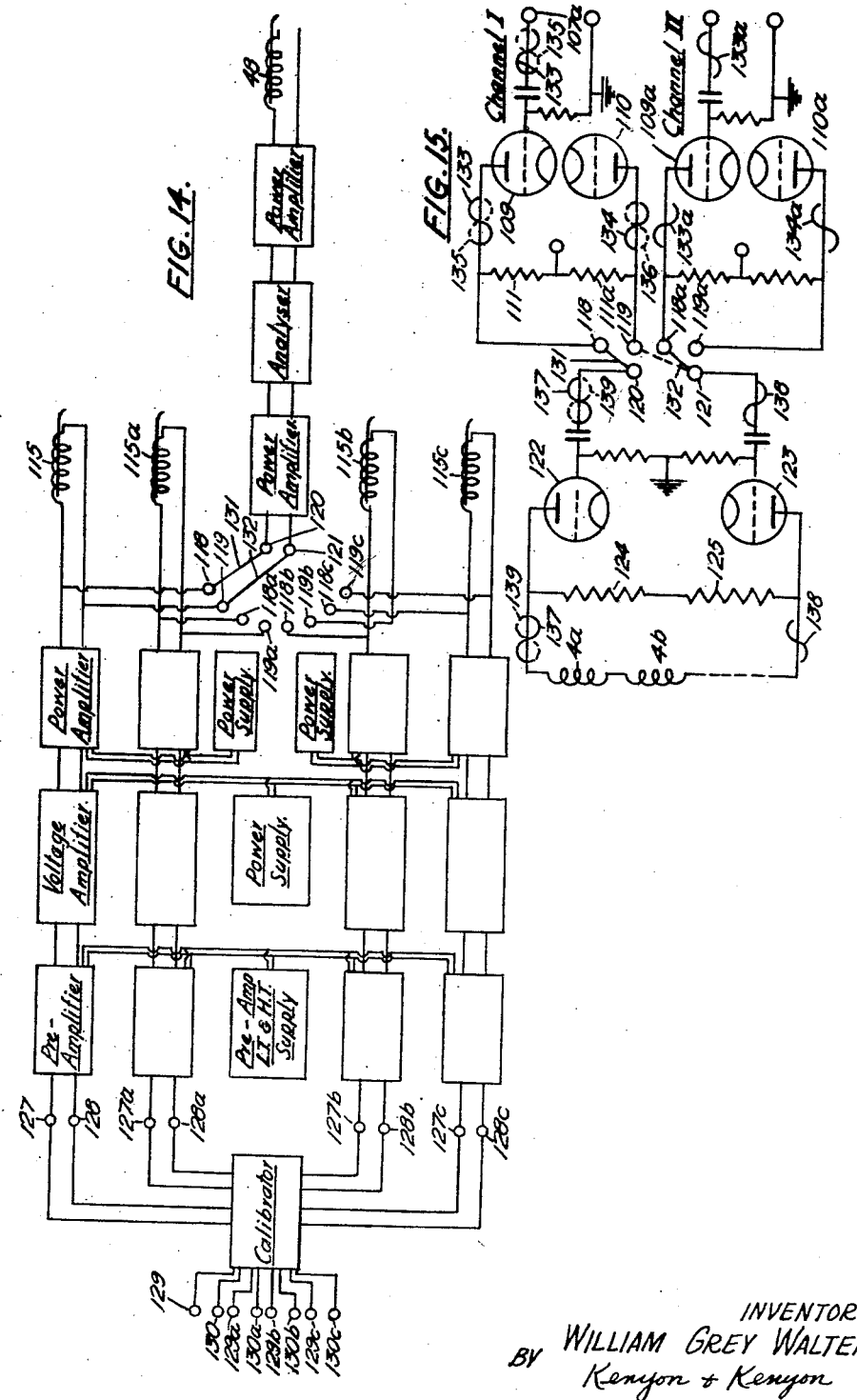
INVENTOR
WILLIAM GREY WALTER
BY Kenyon & Kenyon
ATTORNEYS Aug. 11, 1953   W. G. WALTER   2,648,822
WAVE FORM ANALYSING APPARATUS
Filed Aug. 6, 1947   10 Sheets-Sheet 9

INVENTOR
WILLIAM GREY WALTER
BY Kenyon & Kenyon
ATTORNEYS

Aug. 11, 1953  W. G. WALTER  2,648,822
WAVE FORM ANALYSING APPARATUS
Filed Aug. 6, 1947  10 Sheets-Sheet 10

INVENTOR
WILLIAM GREY WALTER
BY Kenyon & Kenyon
ATTORNEYS

Patented Aug. 11, 1953

2,648,822

UNITED STATES PATENT OFFICE 2,648,822

WAVE-FORM ANALYZING APPARATUS

William Grey Walter, Bristol, England

Application August 6, 1947, Serial No. 766,707
In Great Britain February 11, 1943

Section 1, Public Law 690, August 8, 1946
Patent expires February 11, 1963

19 Claims. (Cl. 324—77)

This invention is for improvements in or relating to wave-form analysing apparatus.

An object of the invention is to provide apparatus capable of performing automatically continual analyses of, more particularly, complex semi-periodic wave-forms, such, for example, as those associated with the electrical potentials obtainable from biological material (e. g. electroencephalogram or heart-action potentials) or of the oscillations of vibrating machinery.

The invention accordingly provides wave-form analysing apparatus including a frequency-sensitive device which is responsive to (and is operable to indicate the amplitude of) a frequency to be analysed, means for energising the said device under the control of an electrical current varying in accordance with a wave-form to be analysed, a storage-register unit associated with the said device (but supplied from a current source independent of that energising the said device) and operable to integrate amplitude data over a predetermined time interval under the control of the said device and of a timer, a recording device operable to provide a visual quantitative indication of the content of the register unit, and read-out means also under control of the timer for transmitting to the recording device the content of the register unit integrated over the predetermined time interval.

The frequency-sensitive device is preferably arranged to be associated selectively with more than one storage-register unit, which are each operable to receive and to integrate the said data when so selected, the read-out means being operable to transmit the integrated content of a register unit to the recording device at a time during which data are being received and integrated by another such unit.

The invention includes wave-form analysing apparatus comprising a plurality of frequency-sensitive devices each of which is responsive to (and is operable to indicate the amplitude of) a different frequency to be analysed, means for energising each said device under the simultaneous control of an electrical current varying in accordance with the wave-form to be analysed, a multi-unit storage-register having a plurality of separate units each associated with a different one of the frequency-sensitive devices (but supplied from a current source independent of that energising the said devices) and each operable to integrate amplitude data over a predetermined time interval under the control of its related frequency device and of a timer, a recording device operable to provide a visual quantitative indication of the contents of the register units, and read-out means also under control of the timer for transmitting to the recording device the content of each of the register units integrated over the predetermined time interval.

Preferably, in the arrangement set forth in the preceding paragraph, more than one multi-unit storage-register is provided and the frequency-sensitive devices are arranged to be associated selectively each with more than one register unit, one in each register, which units are operable to receive and to integrate the data when so selected, the read-out means then being operable to transmit the integrated contents of a multi-unit register to the recording device at a time during which data are being received and integrated in another register. By this means a continual analysis may be made without interruption, since immediately following the time at which data cease to be integrated in one register they can start to be integrated in another register.

To simplify the interpretation of the final record of a multiple frequency analysis it is desirable that the analysis should be presented with the individual frequency components arranged in systematic order. It is accordingly a feature of the invention that the read-out means should operate to transmit the contents of the units of each register to the recording device in succession in a natural sequence of the frequencies of the frequency-sensitive devices with which the register units are associated.

The frequency-sensitive device or devices referred to above may each comprise a lightly damped magnetically operated reed tuned to resonate at the desired frequency and arranged to be energised by a solenoid, each reed being associated with a mercury or spring electrical contact and carrying a contact point arranged to make contact with the spring or mercury when the reed is vibrated, whereby the duration of the electrical contact so established in a cycle of vibration of the reed is a function of the amplitude of vibration and, in an epoch, also of the number of vibrations of the reed and hence, of the energy at the frequency to which the reed is tuned. It will be appreciated that the more highly selective the frequency-sensitive device the greater is its build-up time and decay time so that its amplitude at any one moment depends not only on the wave-form applied at that moment but on events during the preceding moments during which the vibrational element has been building-up or decaying; this phenomenon imposes limitations on the present system which will be pointed out more particularly hereinafter.

The expression "tuned to resonate at the desired frequency" does not imply absence of response at other than a desired frequency. Thus, in the analysis of a wave-form containing frequencies of the order of 10 cycles per second it may be desirable to employ certain reeds which are "tuned" respectively to 9 and 10 cycles per second but it should be noted that the frequency resolution could well be such that the application of, say, a steady frequency of 9.5 cycles per second would be indicated by a sub-maximal vibration of each of the 9 and 10 cycle reeds. Further, a similar result could be obtained from the application of an oscillation containing equal amounts of energy at 9 and 10 cycles per second. The possibility of this kind of ambiguity can be reduced by giving the reeds a band-pass characteristic, for example, by providing coupled pairs of reeds to serve as a single frequency sensitive device, or by tuning the energising solenoid, and the expression "tuned to resonate at the desired frequency" as used herein, and in the accompanying claims, is intended to cover such broadly resonant arrangements.

In place of the electrical contact accessory to the reeds previously described they may each be associated with a separate photo-voltaic cell and a separate thermionic tube, the photo-voltaic cell and tube being so connected that the anode current through the tube is controlled in accordance with the quantity of light falling upon the cell, means also being provided which is under the control of the reed for varying the quantity of light incident upon the cell in accordance with the duration and amplitude of vibration of the reed. In this arrangement the tubes are preferably of the multi-grid type and are so connected in circuit with the photo-voltaic cells that their control grids become positive with respect to their cathodes when the cells are illuminated, while connections are also provided to second grids of the tubes to permit them to be biassed to a condition of minimum anode current at a condition of minimum illumination of the cells.

Alternatively, the reeds may each be associated with a separate photo-electric cell, the aforesaid means for varying the quantity of incident light being used in conjunction therewith.

An important feature of the invention resides in the employment of an electrical capacitance as a storage-register unit which is arranged to gain or to lose electrical charge under the control of the related frequency-sensitive device, in an amount which is a function of the amplitude indications from the device, the charging current being derived from a source independent of that energising the said device.

The invention also includes an electro-encephalograph, including wave-form analysing apparatus as set forth above.

Several embodiments of the invention will now be described by way of example, with reference to the accompanying drawings in which:

Fig. 1 is a perspective view of an assembly of four frequency-sensitive devices, comprising electro-magnetically operated reeds, Figs. 2A, 2B and 2C are graphs showing the theoretical response of a group of frequency-sensitive devices under various conditions, Fig. 3 is a circuit diagram of one form of wave-analysing apparatus in accordance with the invention, employing frequency-sensitive devices of the kind shown in Fig. 1, Fig. 3B is a schematic and circuit diagram of the details of the means synchronizing the various switches together, Figs. 4A, 4B, 4C and 4D are theoretical graphs showing the relation between the amplitude of vibration of a frequency-sensitive device of the kind shown in Fig. 1 and the resultant duration of contact of associated contact means, Fig. 5 is a circuit diagram of an alternative form of wave-analysing device, employing frequency-sensitive devices including vacuum photo-electric cells, Fig. 6 is a graph showing the observed integration characteristics of several embodiments of the invention, Fig. 7 is a circuit diagram of yet a further form of wave-analysing device, in this case employing photo-voltaic cells and multi-grid tubes, Fig. 8 is a circuit diagram of an amplifier and recording device suitable for use with the circuit of Fig. 7, Fig. 9 is a circuit diagram of an alternative amplifier and recording unit also suitable for use with the circuit of Fig. 7, Fig. 10 is a circuit diagram of a pre-amplifier, voltage amplifier, and power unit which may be used in the application of the invention to electro-encephalography.

Fig. 11 is a circuit diagram of a paraphase power amplifier and electro-magnetically operated recorder, suitable for use in conjunction with the circuit of Fig. 10, as the output stage of an electro-encephalograph.

Fig. 11A is a circuit diagram of the connections for an alternative type of electro-magnetically operated recorder, Fig. 12 is a circuti diagram of a push-pull amplifier for energising a wave-form analysing device in accordance with the invention and suitable for coupling to a paraphase amplifier as shown in Fig. 11, Fig. 13 is a perspective view of part of an assembly of frequency-sensitive devices and photo-voltaic cells grouped about a single light source.

Figure 16:
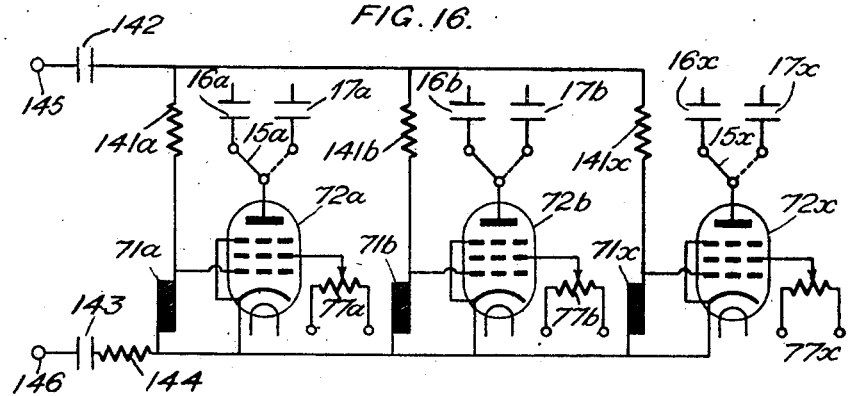
Figure 17A:
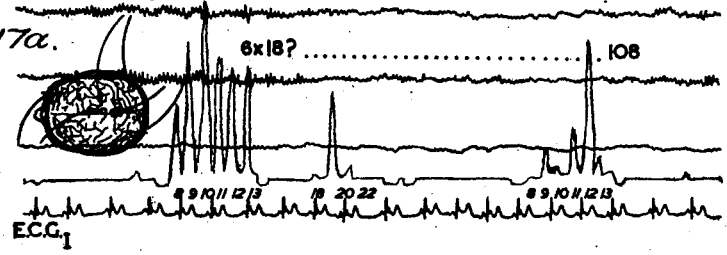
Figure 17B:
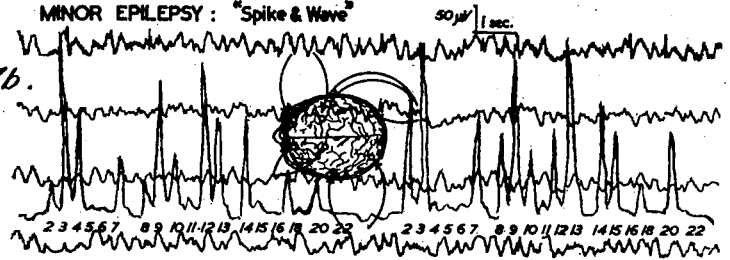
Figure 17C:
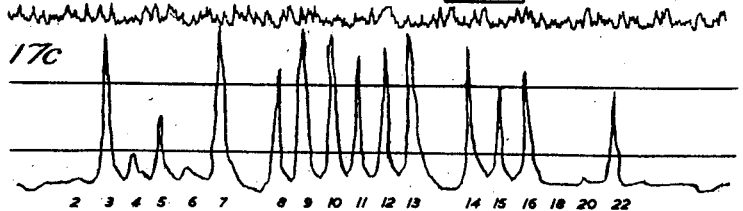
Figure 18:
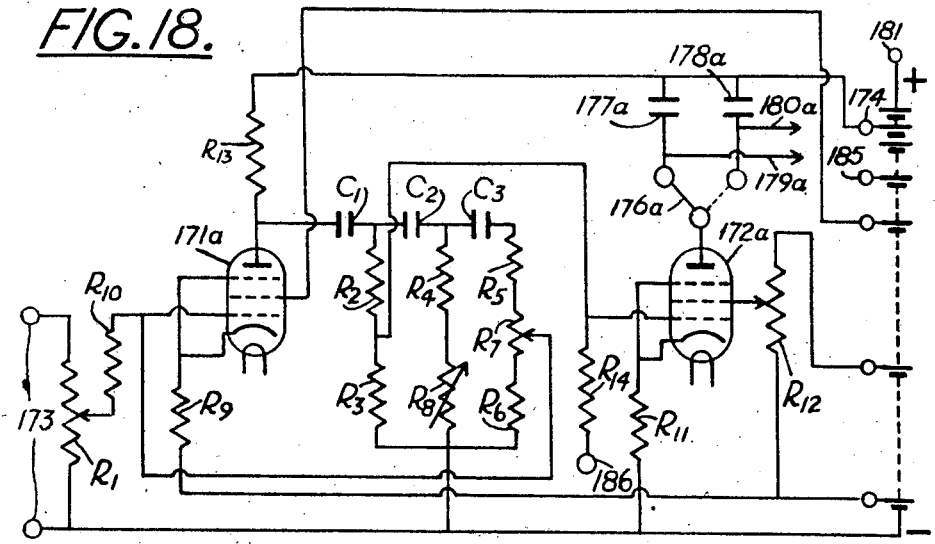
Figure 19:
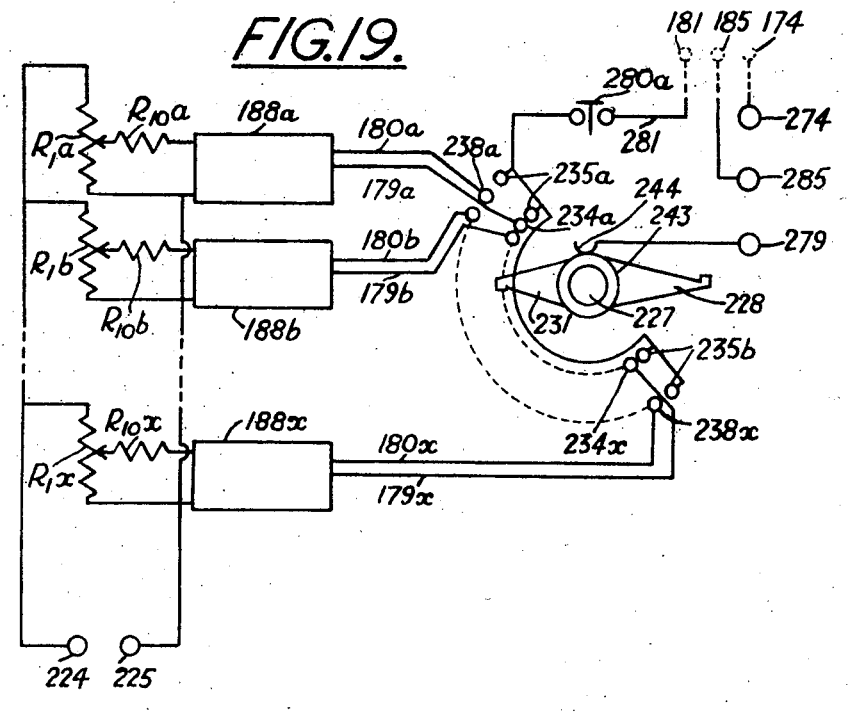

Figs. 13A and 13B are details,

Fig. 14 is a block diagram of a four-channel electro-encephalograph and wave-form analysing apparatus in accordance with the invention showing optional connection of the said apparatus to the several channels, Fig. 15 is a circuit diagram illustrating the use of the invention for phase-discriminating analysis, Fig. 16 is a circuit diagram of means for calibrating the wave-form analysing apparatus and for reconstituting a wave-form being analysed, Figs. 17A, 17B and 17C are representative tracings obtained with a four channel electro-encephalograph amplifier and recorders and showing the frequency-analysis record obtained by the use of wave-form analysing apparatus in accordance with the invention, Fig. 18 is a circuit diagram of an alternative form of frequency-selective and integrating unit comprising an electronic circuit, and Fig. 19 shows schematically a plurality of the Fig. 18 circuit units arranged as a wave-analysing device in the manner of Fig. 7.

In the specific embodiments of the invention described hereinafter, a plurality of frequency-sensitive devices are employed consisting of spring reeds tuned to different frequencies and arranged to be energised by solenoids carrying a current varying in accordance with a wave-form to be analysed. A unit assembly of four such spring reeds is shown in Fig. 1 in which a brass block 1 has bolted to its upper face a pair of rigid plates 2. Between the block 1 and each plate 2 are clamped a pair of flat, straight, steel spring reeds 3. The dimensions and characteristics of the spring reeds depend upon the frequency band to be covered; for the frequency band from one to thirty cycles per second (hereinafter referred to as "C. P. S.") the reeds 3 may conveniently be made of clock-spring steel 0.35 mm. thick, 7.5 mm. wide and 82.5 mm. long.

Each pair of reeds 3 extends horizontally through a separate energising or driving solenoid 4 and between the poles of magnets 5. The reeds 3 are so located that in the position of rest, they lie midway between the poles of the magnets 5 while the dimensions of the solenoids and magnets are such that the free end of each reed can be deflected a distance of 10 mm. on each side of its position of rest. Similar poles of the magnets 5 are bridged by pole-pieces 5a and 5b respectively to equalise the magnetic flux for the four reeds. At the end of each reed 3 is attached a contact wire 6 which is adjustable as to length and extends vertically into a cup 7 containing mercury. In the position of rest of a reed the contact wire 6 is just out of contact with the mercury. Separate mercury cups are provided for each reed. Beyond the wire 6, a light screw-threaded rod 8 is fixed to each reed so as to project up to 55 mm. beyond the free end of the reed and each rod 8 carries a weight 9 threaded thereon so that the resonant frequencies of the reeds can be adjusted by screwing the weights along the rods. For example, a weight of 15 gms. located at the end of a rod 8 gives a spring reed, such as that described, a natural frequency of 3.5 C. P. S. However, when the weight is located at the other end of the rod 8, near the wire 6, the natural frequency of the reed is then 4 C. P. S. Certain of the lower frequency reeds also carry L-shaped damping vanes 10, the L-shaped feet of which dip into dashpots 11 containing oil, for a purpose which will appear hereinafter.

The tuning and adjustment of the reeds is of considerable importance in achieving the object of the invention and therefore the theory of this procedure and the manner of carrying it out will be dealt with in some detail.

The frequencies to which the reeds are tuned depend, of course, upon the frequency band to be analysed. Ideally, the frequencies should be such as to allow the same number of reeds for each octave of the frequency band. Then, if eight separate reeds were provided to respond between eight and sixteen C. P. S. there would be also eight between one and two C. P. S. This logarithmic relationship has the consequence that if equal discrimination is required at all frequencies in the band, a very large number of reeds must be provided and the tuning of the lower frequency reeds is very difficult, since, on this basis 1.72 C. P. S. would need to be distinguished from 1.84 C. P. S. Moreover, the sharpness of tune of the low frequency reeds would need to be as great as that of the higher ones. The number of vibrations which a reed would take to reach its maximum excursion would then be the same at all frequencies, and the time taken by this process would be greater as the frequency decreases, so that in the 1 to 30 C. P. S. band the lowest frequency reeds would take 10 seconds or more to build-up to and to die away from their maximum response, while those in the mid-frequencies would take only a second or so. In the wave-form apparatus under consideration, it is more convenient and adequate to arrange for the sharpness of tune to be less for the lower frequencies. In this way the build-up and die-away time may be made more nearly similar for all the reeds, and at the same time fewer reeds are needed for the lower frequencies.

In calculating the requisite weights and damping factors of the reeds it is convenient to use the analogy with electrical circuits in which the mass of the vibrating element is equivalent to inductance, the compliance of the spring to capacitance and the resistance to movement to resistance. The sharpness of tune may then be considered as "Q." In practice, it is expedient to have one of these factors constant for all the reeds. It has been found best to have all the reeds made from the same material and this fixes their compliance. Tuning can then be effected by adjustment of a mass, such as weights 9 in Fig. 1 (which is great compared with the effective mass of the spring itself), and Q may be adjusted by variation of the damping, for example, by a dashpot such as the oil dashpot 11 and damping vanes 10.

In particular applications of the invention (such as to electro-encephalography) it may be convenient to group the reed frequencies to some extent in bands of special interest. When this is done case must, however, be taken to adjust the damping factor and sensitivity of each reed so that the Q gives equal coverage at each frequency. The choice of bandwidth depends upon the frequencies to be considered, but in the present apparatus it has been found convenient to adjust each reed so that its amplitude of response at resonance is four times its amplitude of response when driven at the frequency of the next adjacent reed in the scale. In such a case the factor Q is then different for most reeds. The Q of a reed can easily be measured by noting the time taken for a vibration to die-away when a driving current of steady amplitude and frequency is stopped. This time gives a measure of the logarithmic decrement, from which Q may be computed by the expression:

$$Q = \pi f t$$

where $f$ is the frequency of the reed in C. P. S. and $t$ is the time in seconds taken for the amplitude of vibration to diminish from a steady value to $1/e$ ($=35\%$) of that value when the driving current is switched off.

In the following table is shown the mass of the tuning weight 9, the distance of the weight from the free end of the reed-spring 3, the resonant frequency in C. P. S., and the Q and time constant of decay of each of 24 reeds tuned to resonate at different frequencies in the band from 1.5 to 30 C. P. S.

Table

| Weight in gms. | Distance of weight in mms. | Resonant frequency in c. p. s. | Q | Time constant (to decay to 1/e) in secs. |
|---|---|---|---|---|
| 80 | 55 | 1.5 | 6 | 1.3 |
| 80 | 5 | 2 | 8 | 1.3 |
| 30 | 55 | 2.5 | 10 | 1.3 |
| 30 | 5 | 3 | 12 | 1.3 |
| 15 | 55 | 3.5 | 14 | 1.3 |
| 15 | 5 | 4 | 16 | 1.3 |
| 7 | 55 | 5 | 10 | 0.64 |
| 7 | 5 | 6 | 12 | 0.64 |
| 3.7 | 55 | 7 | 14 | 0.64 |
| 3.7 | 5 | 8 | 16 | 0.64 |
| 2.2 | 55 | 9 | 18 | 0.64 |
| 2.2 | 5 | 10 | 20 | 0.64 |
| 1.5 | 55 | 11 | 22 | 0.64 |
| 1.5 | 5 | 12 | 24 | 0.64 |
| 1.0 | 55 | 13 | 26 | 0.64 |
| 1.0 | 5 | 14 | 28 | 0.64 |
| 0.8 | 55 | 15 | 30 | 0.64 |
| 0.8 | 5 | 16 | 32 | 0.64 |
| 0.55 | 55 | 18 | 18 | 0.32 |
| 0.55 | 5 | 20 | 20 | 0.32 |
| 0.37 | 55 | 22 | 22 | 0.32 |
| 0.37 | 5 | 24 | 24 | 0.32 |
| 0.25 | 55 | 27 | 18 | 0.21 |
| 0.25 | 5 | 30 | 20 | 0.21 |

Referring now to Fig. 2A, the five curves A, B, C, D, and E represent resonance or selectivity curves for five reeds in any of the frequency bands 8, 9, 10, 11 and 12 or 1.5, 2, 2.5, 3 and 3.5 or 20, 22, 24, 27 and 30. The reeds are adjusted so that their response is 75% down at one reed off tune and their several sensitivities are the same. If reeds 8, 9, 10, 11 and 12 are considered, their respective Q factors will be 16, 18, 20, 22 and 24, and this value may be checked by measuring the bandwidth at which the response is $1/\sqrt{2}(\fallingdotseq 70\%)$ of that at resonance, since $$Q = \frac{f_0}{f_h - f_1}$$

where $f_0$ is the resonant frequency and $f_h$ and $f_1$ are respectively the frequencies above and below $f_0$ at which the response is reduced to $1/\sqrt{2}$ of the resonant response. The response curves are seen to overlap throughout the whole of the three ranges, giving coverage of the intermediate frequencies.

In Fig. 2B curve F indicates the amplitude of vibration of the five reeds when responding to a steady pure frequency of 10 C. P. S. The several amplitudes reach points on the resonance curve of the 10 cycle reed. The dotted curve G in Fig. 2B shows the result of driving the same five reeds with a current at 9.5 C. P. S.; the same curve is traced but in this case both the 9 and 10 cycle reeds respond at half maximum, indicated by points H and J, the peak of the curve falling mid-way between the two. It will be appreciated that the relationships of Fig. 2B apply equally to the case of five reeds in the 1.5 to 3.5 C. P. S. band when driven by a steady 2.5 C. P. S. wave-form or by an intermediate frequency of 2.25 C. P. S.

Fig. 2C indicates the response to current containing equal proportions of 9 and 10 C. P. S. In this case both the 9 and 10 cycle reeds are driven to half their full amplitude, indicated by points M and N. This happens when the two frequencies are each 40% of the intensity required for maximum amplitude, since each of the two reeds receives from the adjacent frequency an extra 10% energy, bringing its response up to 50% of its maximum amplitude. Confusion of this type of response to two simultaneous frequencies with that due to a single intermediate frequency as shown in Fig. 2B may be reduced by close inspection of the responses of the other reeds and by comparing the form of the primary waveform.

Returning now to Fig. 1, it has been stated that the contact wires 6 are so adjusted that when the reeds are at rest the wires 6 are just clear of the mercury surfaces in the cups 7. When the reeds vibrate the wires 6 dip in and out of the mercury surfaces, making and breaking contact therewith, without impeding the motion of the reeds and these successive contacts are utilised, in accordance with the invention, to indicate the amplitude of the frequencies to be analysed, as will now be described.

In the circuit diagram of Fig. 3 the frequency-sensitive reeds and contact devices already described are shown diagrammatically as reeds 3a, 3b ... 3r each with energising solenoids 4a, 4b ... 4r respectively, and contact wires 6a, 6b ... 6r each with associated mercury cups 7a, 7b ... 7r. While only three such reeds etc. are shown in Fig. 3, it should be understood that eighteen such reeds are employed in the present embodiment of the invention; the resonant frequencies of the reeds are as follows: 2, 3, 4, 5, 6, 7, 8, 9, 10, 11, 12, 13, 14, 15, 16, 18, 20, and 22 cycles per second.

It will be observed that in this embodiment of the invention the 1.5, 2.5 and 3.5 C. P. S. reeds referred to in the foregoing table have been omitted and the top frequency is 22 C. P. S. To maintain adequate coverage of the lower frequencies of the Q of the reeds tuned to 2, 3 and 4 C. P. S. is made lower than that given in the table.

The contact wires 6a, 6b ... 6r are each connected through the related spring reeds 3a, 3b ... 3r to the positive pole of a direct current source indicated at 12. Each of the mercury cups 7a, 7b ... 7r is also connected in series with a separate resistance 13a, 13b ... 13r having a value of 4 megohms and thence to the pole of an associated change-over switch 14a, 14b ... or 14r. The switches 14a, 14b ... 14r are ganged together for conjoint operation between the full- and dotted-line positions shown. In the full-line positions of the switches 14 the resistances 13a, 13b ... 13r are joined each to the pole of a further associated change-over switch 15a, 15b ... or 15r, as the case may be. The switches 15 are also ganged together for conjoint operation between the full- and dotted-line positions indicated. In the full-line positions the switches 15 serve to connect the resistances 13a, 13b ... 13r each to a separate associated capacitance 16a, 16b ... 16r and, in the dotted-line positions, to capacitances 17a, 17b ... 17r. Resistances 18, 19 and 20 are connected in series across the current source 12 (which has an overall output voltage of 150 volts) and these resistances have such values that the reeds 3 stand at a potential of +75 volts with respect to earth which, as will be seen, is connected between resistances 18 and 19. The sides of the capacitances 16 and 17 remote from the resistances 13 are connected together and to the source 12 between the resistances 19 and 20 and stand at a potential of —65 volts with respect to earth. The negative side of the current source 12 stands at a potential of —75 volts with respect to earth.

The method of operation of each of the eighteen reed-contact-resistance and capacitance devices is similar and will, therefore, first be considered in relation to one such device only, namely reed 3a with switches 14a and 15a in the full-line positions shown.

When the reed 3a is at rest, no charge accumulates in the capacitance 16a since the contact wire 6a does not make contact with the mercury cup 7a. However, when the reed is vibrated under the control of a current flowing in the energising solenoid 4a, the wire 6a makes contact during every other half cycle of vibration with the mercury in cup 7a and current then flows through resistance 13a and over switches 14a and 15a into the condenser 16a. If the reed were to vibrate for an infinite time the side of the condenser 16a connected through the said switches with the resistance 13a and the contact would reach a potential equal to that of the reed 3a with respect to the other side of the condenser, viz: 75 plus 65 volts positive. For a time less than infinity the voltage reached by the condenser 16a depends upon the length of time the contact is made, the capacity of the condenser 16a and the value of the resistance 13a. As is well known, these factors are related by the expression:

$$E_t = E_{max}(1 - e^{-t/CR})$$

where $E_t$ is the voltage after time $t$,
$E_{max}$ is the voltage of the source,
$e$ is 2.7 . . . (the base of natural logarithms),
$C$ is the capacity of the condenser, and
$R$ the resistance of the circuit.

If the voltage of the source, the capacity of the condenser and the resistance are fixed, the voltage reached depends only upon the time for which the contact is made. In the present case, the condensers 16a, 16b . . . 16r and 17a, 17b . . . 17r have the same capacities, namely 1 $\mu f$. and the resistances 13a to 13r being, as already stated, 4 megohms. Therefore, if the reed 3a is in maximum vibration for a period of, say, 10 seconds and the intermittent contact is made for nearly half this time, the charge acquired by the condenser will be about 100 volts. The operating voltage and values of resistance and capacity of the components 13a etc. and 16a etc. have been chosen so that only the early part of the exponential charging curve of the condenser is used for durations of contact of about 5 seconds. This results in a nearly linear relationship being achieved between duration of contact and charge on the condenser.

Referring to Fig. 4A, four negative half-cycle sine-waves of the same periodicity are shown having amplitudes $W_1$, $W_2$, $W_3$ and $W_4$ intersecting a mercury surface 21. The line 22 represents the rest position of a reed contact wire in respect to the mercury surface and is also a time axis in respect of the periodicity of the waves. The curves $W_1$ to $W_4$ can therefore be regarded as time/displacement curves of the contact wire for different vibrational amplitudes and distances $T_1$, $T_2$, $T_3$ and $T_4$, over which the curves $W_1$ to $W_4$ respectively intersect the surface 21, measure the duration of contact of the contact wire with the mercury surface for the different given amplitudes of vibration of the reed. From Fig. 4 it will be seen that the greater the amplitude of vibration, so is the duration of contact longer for a given half cycle of vibration; in addition, the longer the total time of vibration of the reed, the greater is the total duration of contact. The charge acquired by a condenser such as 16a therefore depends both on the duration of vibration and upon the amplitude of vibration of the reed. When the reed is driven throughout the whole of a fixed charging period or "epoch" the charge acquired by the condenser then depends only upon the amplitude of vibration. This relation is shown graphically in Fig. 4C which is a plot of the wave amplitudes from Fig. 4A against the corresponding duration of contact between the wire and the mercury surface. The extreme curvature of the curve of Fig. 4C shows that the arrangement is very much more sensitive to differences in the lower range of amplitudes than in the higher.

A different and more complex relationship obtains when the reed is energised for less than the whole epoch. In this case, the larger the driving force, the sooner the reed attains an amplitude such that the contact wire reaches the mercury surface 21, and, when the driving force is removed, the longer the reed vibrations take to decay to a point where the contact wire no longer reaches the mercury surface. Fig. 4B is similar to Fig. 4A but, in this case, the sine-waves are represented as each having been reduced in amplitude by 33⅓ percent to give new amplitudes $W_1b$, $W_2b$, $W_3b$ and $W_4b$ and corresponding contact times $T_2b$, $T_3b$ and $T_4b$ respectively. The time/displacement curves of Fig. 4B can therefore be regarded as a damped half-cycle subsequent to that of Fig. 4A. Fig. 4B shows how the duration of contact is increased for large original amplitudes by the addition of subsequent contacts as the vibration decays. The larger the original vibration, the longer the time until the contact is no longer made and therefore the greater the charge acquired by the condenser. Fig. 4D is a graph plotted from Figs. 4A and 4B showing how the addition of only one damped half-cycle wave decreases the curvature of the amplitude-contact relationship. When more than one damped half-cycle wave is taken into consideration, the linearity of the amplitude-contact relationship improves still further.

Reverting to Fig. 3, it has been shown how the condensers 16a to 16r receive increments of charge by the intermittent contacts between the wires 6a to 6r and the mercury cups. These condensers, therefore, sum and store indications of amplitude and duration of vibration of the related reeds and comprise the units of a first storage register. If, however, the condensers were to be left permanently in circuit, they would ultimately acquire a full charge and the arrangement would cease to operate. The storage register must, therefore, be disconnected after a predetermined time interval or epoch. This is done under control of a timer by the ganged change-over switches 15a to 15r which, when changed over to occupy the dotted-line position shown, connect in place of the first storage-register, a second storage-register comprising the condensers 17a to 17r. By this arrangement the process may at once recommence. The units 16a etc. of the first register then hold charges which are indications of the vibrational energies of the associated reeds during the previous epoch. In the embodiment here considered the epoch has been chosen to be 10 seconds and the switches 15a to 15r are motor-driven (by means to be described) so that the change-over occurs automatically at intervals of 10 seconds. The motor thus constitutes the timer above-mentioned. Other lengths of epoch can, however, be arranged depending upon the nature of the phenomena to be investigated. Additionally, it may be convenient, as shown in Fig. 3, to provide a third storage-register comprising condensers 23a to 23r each of the same capacitance (3 $\mu f$., in the present case but different from condensers 16a and 17a etc. and connected through the switches 14a to 14r (in the dotted line position shown) so that summation and storage may proceed at a rate other than the basic 10 second epoch whereby a short-term analysis may be compared with a longer term analysis.

The operation of the third storage-register in the present arrangement will be further described in connection with the description and operation of the read-out and recording means, which follow.

As appears from Fig. 3, the energising solenoids of the reeds are all connected in series and to input terminals 24 and 25 which, in practice, are joined to a current source varying in accordance with the wave-form to be analysed. All the reeds are thereby energised by the same current and each reed is caused to vibrate in proportion to the energy of frequency band to which it is sensitive contained in the wave-form. Under these conditions each condenser unit in the bank of condensers connected during a particular epoch, contains a charge indicating the energy of vibration of its associated reed and hence of the various components of the wave-form during the epoch in question.

To provide a visual quantitative indication of the contents of the register units the sides of the condensers 16a, 16b . . . 16r nearest to the switches 15a, 15b . . . 15r are respectively connected by wires 25a, 25b . . . 25r to a semi-circular bank of contacts 26a, 26b . . . 26r of a rotary selector switch indicated at 27, so as to be scanned in succession by a rotatable contact arm 28 The condenser bank 17a . . . 17r is similarly connected by wires 32a, 32b . . . 32r to a second bank of contacts 30a, 30b . . . 30r on the said stitch so as to be scanned by a contact arm 31 displaced by 180° from the arm 28. The third bank of condensers 23a . . . 23r are also similarly joined by wires 29a, 29b . . . 29r to a third bank of contacts 33a, 33b . . . 33r on the switch so as to be scanned by a contact arm 34 coincident in angular position with the arm 31.

The connections from the condensers to the contacts of the rotary switch are made in the natural sequence of the frequencies of the associated reeds so that in scanning the contacts by clockwise rotation of the arms 28, 31 and 34, the frequency band 2, 3, 4, 5, 6, 7, 8, 9, 10, 11, 12, 13, 14, 15, 16, 18, 20 and 22 C. P. S. is scanned through in that order.

The first and last contacts 35a and 35b respectively in each bank of contacts and the eighth contacts 36 and fifteenth contacts 37 in each bank are isolated from the condenser banks but connected together and joined by a wire 38 to the negative side of the supply 12 and to the resistance 20. Contacts 35, 36 and 37 therefore stand at a potential of −75 volts with respect to earth.

The rotary switch 27 is also under control of the timer, being driven by a synchronous motor, whose shaft is indicated at 39, so that each switch arm is advanced through 180° in the analysing epoch of 10 seconds. The timing and driving motor shaft 39 also drives a cam-member 40 at a quarter of the angular speed of the rotary switch 27 and the member 40 has a raised cam 41 extending along a quarter of its circumference which is arranged to close a pair of contacts 42 for a quarter of a revolution of the cam member 40.

The contact arms 28, 31 and 34 are each in electrical connection with a slip-ring 43 carried by the switch 27; a brush 44 bears on the slip-ring and is connected either through a switch 45 in the full-line position shown or, in the dotted-line position, via the cam contacts 42 (when closed) to the grid of a ten watt triode power tube 46, which may conveniently be tube type PP5/400. The grid of tube 46 is connected through a resistance 47 to the junction of resistances 19 and 20. In the anode circuit of tube 46 is a moving iron recording oscillograph 48 connected to the positive side of a power source 49 having a stabilised voltage of about 400 volts and able to deliver up to 60 ma. The negative side of the source 49 is returned to a tapping on a resistance 50 placed across the filament of the tube 46 and to earth or, if an indirectly heated tube is used, to the cathode and to earth.

Under these conditions the resting potential of the grid of tube 46 is about 65 volts negative with respect to the cathode; the tube then passes only a very small anode current of approximately 5 ma.

The switches 15a to 15r are operatively connected to the rotary switch 27 to be moved automatically from the full-line position to the dotted-line position as the selector arm 31 leaves a contact 35b and before the arm 28 engages a contact 35a, and similarly from the dotted-line position to the full-line position as the selector arm 28 leaves a contact 35b and before the arm 31 engages a contact 35a.

The switches 14a to 14r and switch 45 are all ganged together for conjoint movement from the full to the dotted line positions under manual operation. The cam-member 40 is so timed in relation to the rotation of the selector switch 27 that the cam 41 closes the contacts 42 for ten seconds while the arm 34 passes over the contacts 35a, 33a, to 33r and 35b. The cam 41 also operates to restore automatically the switches 14a to 14r to the full-line position simultaneously with the opening of the cam contacts 42. The switch 45, however, must be reset manually to the full-line position shown.

Fig. 3B shows a detail of the means for synchronizing the various switches together. While shown schematically in Fig. 3, each of the switches 15a–15r may be of the rotary type as illustrated in Fig. 3B, only switch 15a being shown in this figure for clarity. The two semi-circular conducting segments 300 and 301 of this switch are connected to condensers 16a and 17a, respectively. The slider or rotatable contact arm 302 is mechanically coupled to the shaft of rotary selector switch 27 and to the shafts of the similar switches 15b—15r. Slider 302 engages semi-circular segment 300 of switch 15a during the time that contact arm 31 of rotary switch 27 engages its contacts 35a—35b in turn. Similarly, slider 302 engages semi-circular segment 301 during the time that contact 28 of rotary switch 27 engages its contacts 35a—35b in turn. Brush 303 contacting slider 302 is connected to the left-hand contact of switch 14a, whose switch blade is moved back-and-forth by arm 304 pivoted at one end to another arm 305. Arm 305 is pivoted at its other end to a fixed point adjacent rotating cam 41 and bears, intermediate the pivot points, a projection 306 positioned for engagement by a lateral extension on the leading edge of cam 41, as the latter rotates, to move switch 14a to the full-line position illustrated. Spring 307 is provided, as shown, to snap arm 304 to the left as soon as cam 41 engages projection 306. Arm 304 may be moved manually to the right by means of a manually-actuated pivoted lever 308 engaging at one end pin 309 borne by arm 304. Rotating pivoted arm 308 from the indicated "Normal" position to the indicated "40/10" position will thus move arms 304 and 305 to the right to the dotted line position indicated, carrying the blade of switch 14a to its dotted line position to connect with condenser 23a. Extension 310 provided on arm 304 engages pin 311 extending from the blade of switch 45 so that this manual movement just described also carries the blade of switch 45 to the right to its indicated dotted line position. However, note (as pointed out more fully hereinafter) that when switches 14a, 14b—14r are returned to their full line position automatically by cam 41 at the end of the desired ten second interval of the 40 second epoch, switch 45 remains in this dotted line position and must manually be returned by the operator.

The operation of the circuit of Fig. 3 is as follows:

When it is required to analyse successive 10 second epochs of the wave-form under examination the switches 14a to 14r and 45 are set to the full-line position. By this means the third storage-register 23a to 23r is disconnected from circuit and the slip-ring 43 is connected, via the brush 44, directly to the grid of the tube 46.

The timing and driving motor driving shaft 39 being started, the arms 28 and 31 rotate and, as each engages its associated bank of contacts, it leads off in succession to the grid of tube 46 the positive charges which have accumulated in the associated bank of storage condensers in the preceding epoch of 10 seconds. These charges drive the grid of the tube 46 positive (or less negative than −65 volts, which it will be recalled is its resting potential) and the anode current in the tube rises by a proportional amount so that the recording oscillograph 48 is transiently deflected by an amount proportional to the magnitude of the charge acquired by each of the storage-condensers. Thus, by the steady rotation of the switch 27 the recording oscillograph receives a succession of pulses, each proportional to the charges on the condensers 16a to 16r and 17a to 17r, which charges are, as already shown, indications of the energy at various frequencies in the wave-form under analysis.

The size of the resistance 47 (value 75,000 ohms) is so chosen, having regard to the maximum charge that can be acquired by the condensers, that the condensers are just completely discharged in the period in which the scanning arms 28, 31 or 34 engage a condenser contact.

The recording oscillograph can therefore trace a series of brief deflections, each of which indicates the amount of energy at the various frequencies in the wave-form under analysis for each of successive 10 seconds epochs.

It will be recalled that the contacts 35a and 35b stand at a potential of −75 volts with respect to earth which is to say, 10 volts negative with respect to the grid bias of tube 46. Accordingly, when arms 28 or 31 reach these contacts 35a and 35b the grid of tube 46 is driven slightly more negative; the anode current through the tube is accordingly further reduced and on each occasion the oscillograph traces a small deflection in the opposite direction to those indicating the analysis of the wave form. These small double negative deflections mark the end of one scanning epoch and the beginning of the next.

The contacts 36 and 37 similarly provide single negative pulses dividing the recorded analysis into frequency bands to facilitate interpretation of the record by acting as a scale.

It will be observed that the embodiment of the invention just described (insofar as the operation of the storage-registers 16a to 16r and 17a to 17r is concerned) involves accumulation of the analysed data over a first period of 10 seconds and recording the data so accumulated during the next 10 seconds, while a further analysis is being made. When the invention is applied to apparatus in which the waveform to be analysed is also recorded as a primary trace, it is preferred to arrange that the recording oscillograph traces the analysis directly over the recorded wave-form from which the analysis has been made and to which it refers. In such a case, the recording point of oscillograph 48 may be displaced such a distance in advance of the primary recorder in the direction of movement of a recording surface that the analysis tracing begins just as the portion of the record to which it refers, reaches that point. For example, supposing the speed of the recording surface to be 1.5 cm./sec. and the analysis and scanning epoch to be 10 seconds, the writing point of oscillograph 48 should be 15 cm. in advance of the writing point of the primary recorder, measured in the direction of the recording surface.

In the alternative operation of the circuit of Fig. 3 in which the switches 14a to 14r and 45 are in the dotted-line position, the storage-register 23a to 23r only is operative. In this case, the condensers 23a to 23r sum and store amplitude indications over a period of 30 seconds, during which time the arm 34 performs one-and-a-half revolutions and the contacts 42 are open. In the next 10 seconds the contacts 42 are held closed by the cam 41 and the arm 34 traverses the contact bank 35a, 33a to 33r and 35b so that the positive charges accumulated in the register are read-out to the grid of the tube 46 via brush 44 and contacts 42. The oscillograph 48 makes a series of deflections as already described which, in this case, however, indicate the amount of energy at the various frequencies in the wave-form under analysis during the preceding 30 seconds. Confusion of the data accumulated in the register during the 30 second epoch with data from current variations affecting the reeds during the reading-out operation is prevented by the automatic resetting of the switches 14a to 14r under the action of the cam 41 immediately the contacts 42 open. When it is required to return the apparatus to the analysis of the 10 second epoch it is then only necessary to reset switch 45 manually. Negative deflections are derived from the contacts 35a, 36, 37 and 35b in the alternative operation of the apparatus as already described for the first operation.

In Fig. 3 the reeds 3a etc. are shown diagrammatically as driven each through a separate solenoid 4a etc., while in Fig. 1 solenoids 4 drive each a pair of reeds. Either arrangement may be used but in the case where pairs of reeds are driven through a common solenoid it is necessary to select the resonant frequencies of the pairs of reeds so as to avoid magnetic coupling between them. Using the eighteen reeds referred to earlier they may conveniently be arranged in pairs as follows:

2, 11; 3, 12; 4, 13; 5, 14; 6, 15; 7, 16; 8, 18; 9, 20; and 10, 22.

A source of inaccuracy in the arrangement shown in Figs. 1 and 3 is the non-linear relationship between the duration of the reed mercury contact and the amplitude of the wave driving the reed. The adjustment of the contact wires 6a etc. also requires some skill to obtain the best operation. These difficulties are avoided in the arrangement shown in Fig. 5 which differs from Fig. 3 in the employment of vacuum-photoelectric cells in place of the contacts 6a etc. and resistances 13a and in the omission of the third storage-register.

In Fig. 5, eighteen reeds 3a to 3r are assumed to be used, as heretofore, but instead of the reeds carrying contact wires they support very light shutters 51a, 51b ... 51r which serve, when the reeds are at rest, to screen associated vacuum photo-electric cells 52a, 52b ... 52r from a steady light-source 53. Preferably, a single light-source is employed with the photo-electric cells grouped about it. In the present case the reeds are themselves isolated from the supply 12 the positive pole of which is connected to the anodes of all the photo-cells.

The cathodes of the cells 52a to 52r are connected directly to the switches 15a to 15r (the switches 14a to 14r and 45 and the cam contacts 42 of Fig. 3 being omitted consequent upon the omission of the third register). In other respects the circuit of Fig. 5 is similar to that of Fig. 3 and like reference numerals refer to like parts.

The operation of the circuit of Fig. 5 is as follows:

When the reeds 3a to 3r are at rest no light falls upon the photo-cells 52a to 52r which therefore offer a very high resistance to the passage of current. However, when the reeds are set into vibration, light falls upon the cells decreasing their resistance to the passage of current; the condensers 16a to 16r, or 17a to 17r, as the case may be, acquire charges exactly as in the previous arrangement, which charges are then read-out to the recording means by the rotary switch 27 in the manner already described. In the present arrangement, however, the charges acquired by the condensers can be considered as a true integration of the amount of light falling on the photo-cells to which they are connected, and therefore of the energies of vibration of the associated reeds and, hence, of the energies at the reed frequencies in the waveform to be analysed during the analysis epoch.

Fig. 6 shows graphically the accuracy of integration observed in the two embodiments of the invention which have been described. Curve 60 is in respect of the arrangement of Fig. 3 and shows the amplitude of the recorded analysis (i. e. the deflection of the oscillograph 48) for a particular reed in relation to the amplitude of the input at the reed frequency when the oscillation lasts throughout the epoch. This is the most unfavourable condition met in practice; curve 60 should be compared with the curve of Fig. 4C.

Curve 61 is similar to curve 60 but relates to the more favourable condition for the arrangement of Fig. 3 wherein oscillations of large amplitude cause the reed to make more contacts than oscillations of smaller amplitude. The improved linearity of response will be apparent.

Curves 62 and 63 relate to the vacuum photoelectric cell arrangement of Fig. 5. Curve 62 was obtained under the condition of the oscillatory input lasting throughout the epoch and relates the amplitude of recorded analysis to varying amplitudes of input, i. e. the same conditions as curve 60. The greatly improved linearity of curve 62 over curve 60 will be apparent.

Curve 63 was obtained under the condition that the amplitude of the input was constant and the duration of the oscillatory input was varied. Curves 62 and 63 taken together, indicate the satisfactory accuracy of integration which is possible with the arrangement of Fig. 5.

While the arrangement of Fig. 5 is very satisfactory it suffers from the disadvantage of using a number of vacuum photo-electric cells which are a relatively costly item. The circuit of Fig. 7 is designed to provide accuracy of integration equivalent to that of Fig. 5 but employing instead a cheaper kind of photo-electric cell of the barrier-layer photo-voltaic type.

Referring now to Fig. 7, twenty-four reeds 3a, 3b to 3x are provided with energising solenoids shown in Fig. 7 as connected in series to input terminals 24 and 25. The 24 reeds are arranged to resonate at the frequencies 1.5 to 30 C. P. S. as set forth in the table hereinabove. Each reed carries an aluminum shutter 70a, 70b ... 70x, as the case may be, which serve when the reeds are at rest, to screen associated barrier-layer selenium cells 71a, 71b ... 71x from a steady light-source (not shown in Fig. 7). For this purpose it has been found convenient to use photo-voltaic cells of the kind known under the registered trade-mark "Eel." The photo-voltaic cells, when illuminated in conformity with the oscillations of the associated shutters, instead of changing in resistance as in the case of the vacuum photo-cells generate a voltage which is approximately proportional to the area of the cell illuminated.

With each reed and cell unit is associated a multi-grid tube 72a, 72b ... 72x, as the case may be, and the cells 71a etc. are so connected between the control grid and cathode of the corresponding tube that the grids are driven positive with respect to the cathodes when the cells are illuminated. The tubes and photo-voltaic cells thus behave in combination in a manner similar to that of the vacuum photo-cells of Fig. 5. The anodes of the tubes are connected directly to switches 15a to 15x leading to alternative condenser storage-registers 16a, 16b ... 16x and 17a, 17b ... 17x. The anode-side of the banks of condensers are connected to banks of contacts 34a, 34b ... 34x and 38a, 38b ... 38x respectively, arranged to be scanned by contact arms 31 and 28, as before. The sides of the condensers remote from the anodes are connected together by a wire 73 and to an output terminal 74 and a tapping 75 on the positive side of a direct current source 76.

It has been found that the indirectly-heated high-frequency high mutual-conductance pentode tubes of the Mullard type EF.50 having a sharp cut-off are eminently suited for operation in the present circuit. Using such tubes, the screen grids are each connected to the variable contact of a separate associated potentiometer 77a, 77b ... 77x (value 25,000 ohms) the potentiometers being connected in parallel and across a portion of a resistance 78 (value 100,000 ohms) joined across the supply 76 so that the potential of the screen grid of each tube, with respect to its cathode, may be adjusted from about −2 to +2 volts. As will be seen, the cathodes of the tubes are connected together and also connected directly to their respective suppressor grids; these common connections are returned to a tapping on the resistance 78 at a point between the connections to the potentiometers 77a etc. The tapping 75 to which the wire 73 is connected stands at a potential of approximately +145 volts with respect to the negative side of the supply.

Using tubes EF.50 a screen voltage can readily be found for each tube, by adjustment of its potentiometer 77a etc., at which the resistance of the tube (when its associated photo-voltaic cell is dark) is comparable with the leakage resistance of the storage condenser connected in its anode circuit. Under these conditions, no charge will be acquired by the condensers but when light falls upon the cells, due to the vibration of the reeds, the grids of the tubes become positive with respect to their cathodes, and, the resistance of the tubes falling, the condensers acquire charges. The tubes, therefore, behave as variable high resistances controllable in value by light falling upon the cells. The operation of the circuit is most satisfactory when the tube cathodes are heated below their normal rating from the source 76. For example, in the present circuit, tube EF.50 rated at 6 volts 0.3 amp., works best at 4 volts 0.25 amp. Tube type SP4B rated at 4 volts 1 amp., works best at 2 volts 0.6 amp.

An important difference in effect of the present circuit, as compared with those of Figs. 3 and 5, is that the sides of the condensers to be scanned acquire negative instead of positive charges. In consequence, the charges from the condensers 16a to 16x or 17a to 17x cannot be scanned out directly to the recording amplifier described with reference to Figs. 3 and 5 since that requires positive pulses.

It therefore becomes necessary to provide means for inverting the pulses from the storage condensers, as effective on the grid of the tube driving the recording oscillograph. Two different ways of obtaining this effect will now be described with reference to Figs. 7 and 8 and Figs. 7 and 9 of the drawings.

In Fig. 7 the recording amplifier has been omitted; the terminal 74, already referred to, forms one connecting point to the oscillograph amplifier and a terminal 79 which is connected to the brush 44, is the other connecting point. In association with the circuit of Fig. 9, contacts 35a and 35b are provided in the banks of contacts of the rotary switch 27 to mark the beginning and end of the scanning epochs together with further intermediate contacts (as before) such as the contacts 36 and 37 (Fig. 3) to give the desired frequency scale division. The contacts 35a etc. are connected together and may be connected via a switch 80a (when closed) to the positive pole 81 of the supply 76 at a poential of +150 volts with respect to the negative side of the supply or, in other words, at +5 volts with respect to the tapping 75.

The phase-inverting circuit of Fig. 8 includes a transformer 82 having primary terminals 74a and 79a for connection respectively to the terminals 74 and 79 of Fig. 7. The secondary of the transformer is connected, on the one hand, through a rectifier 83 to the grid of tube 46 and on the other hand, by a wire 84 to a further tapping 85 on the resistance 78 (Fig. 7) at a potential of +85 volts with respect to the negative side of the supply or in other words, at a potential of 60 volts negative with respect to tapping 75. Terminal 74a (Fig. 8) is also connected to earth and to the cathode of the amplifying tube 46. A condenser 86 (0.25 μf.) is joined from the grid of tube 46 to the wire as shown. When the circuit of Fig. 8 is used the switch 80a (Fig. 7) is left open and the marking pulses are derived not from the contacts 35a, 35b etc. but by means of a separate scanning arm 87 (Fig. 8) which is carried by the switch 27 to rotate synchronously with the arms 28 and 31 so as to scan at appropriate positions special marking contacts arranged in a separate bank. The special contacts are not shown but as will readily be understood are disposed either out of step with "live" contacts in the other banks, or coincident with blank contacts in the other banks, so that the marking pulses and signal pulses do not occur simultaneously. The special contacts just referred to are also connected together and joined to a tapping 88 on the resistance 78 to stand at a potential of +75 volts with respect to the negative pole of the supply 76.

From the connections just described, it will be appreciated that the grid of tube 46 is biased 60 volts negative with respect to its cathode. The marking pulses derived from switch arm 87 drive the grid of the tube an additional 10 volts negative, when they occur.

The operation of the circuits of Figs. 7 and 8 is generally similar to that of the circuits previously described except that the summation pulses read out by the rotary switch 27 are applied across the transformer 82 and accordingly appear across the secondary of the transformer having undergone a 180° phase shift. The summation voltages applied to the grid of tube 46 in Fig. 8 therefore drive the grid more positive than its standing bias. The rectifier 83 and the condenser 86 are provided for the purpose of ensuring that the grid of tube 46 receives clean positive pulses in spite of the tendency of transformer 82 to introduce oscillatory potentials on the grid when supplied with a large transient pulse in its primary circuit. The tube 46 and the recording oscillograph 48 otherwise operate as in the previously described embodiments.

In the alternative circuit shown in Fig. 9, the cathode of tube 46 is connected via a terminal 79b to the terminal 79 (Fig. 7) and the grid of the tube is also directly connected via terminal 85a to the tapping 85 on the resistance 78 (Fig. 7). The cathode of tube 46 is also connected via a potentiometer 80 (value 250,000 ohms) to a terminal 74b which is arranged to be connected to the terminal 74 of Fig. 7.

To use the circuit of Fig. 9 in conjunction with that of Fig. 7 the switch 80a (Fig. 7) is closed; the operation is then as follows:

The grid of tube 46 (Fig. 9) is biassed negatively with respect to the cathode of the tube by being connected directly to the tapping 85, on the supply 76, which stands at a potential of −60 volts with respect to the tapping 75, to which the cathode is connected through the potentiometer 89 and terminal 74b. Terminals 74—74b are at the standing positive potential of the storage condensers which therefore discharge, as the switch 27 rotates, across terminals 79—79b and through the potentiometer 89. In this case, the negative charges which the condensers have acquired drive the cathode of tube 46 negative with respect to its grid, causing the anode current through the tube to increase and the recording oscillograph to operate as before. The marking pulses are derived from the contacts 35a, 35b etc., as previously described, but are transmitted via terminals 79—79b directly to the cathode of tube 46 which is accordingly driven momentarily more positive by 5 volts through being momentarily connected to the tapping 81 which stands at 5 volts positive with respect to the tapping 75. The negative bias on the tube is thus momentarily increased, the anode current decreased momentarily and the recording oscillograph suffers negative deflections.

In the arrangement of Fig. 8, as applied to Fig. 7, the use of a separate bank of contacts on the rotary switch to provide the marking pulses has been described. It should be understood that in any of the arrangements referred to it is possible to provide such a separate set of contacts and a separate scanning arm or arms therefore. The marking pulses must, however, be applied to the recording oscillograph out of step with the summation pulses.

Fig. 13 shows a convenient arrangement of the reeds, energising solenoids and photo-voltaic cells described with reference to Fig. 7. In the drawing six reeds only are shown, arranged in pairs 93x, 93i; 93r, 93d; 93n, 93c corresponding to the frequencies 30, 9; 18, 4; 14, 3 referred to in the foregoing table. The reeds extend radially outwards from a central supporting ring 90 against which they are clamped by plates 91. Each pair of reeds passes through a single energising solenoid, as in the construction of Fig. 1, and carry weights 92 upon screw-threaded rods secured to their free ends to obtain the required resonant frequency. The free ends of the reeds are also disposed adjacent to the poles of a magnet 93 of which one is provided for each pair of reeds. (The magnets for the centre and right-hand pairs of reeds are omitted in the drawing to show more clearly the other parts.) The magnets are preferably made of an anisotropic ferro-magnetic material such as that known under the registered trade-mark "Ticonal" in order to obtain a high field strength in a small compass but over a relatively wide gap. At right angles to each reed is fixed a light aluminum shutter 94 which extends in front of a housing 95, provided for each reed, in which a photo-voltaic cell is located. The details of the housing 95 are shown in Figs. 13A and 13B which are respectively a front elevation, as seen from the shutter 94, and a horizontal section through the central plane of the housing, looking from above. The housing 95 is provided with a front aperture 96 to the rear of which is disposed a U-shaped retainer 97 passing through pairs of holes in the upper and lower walls of the housing. The retainer 97 limits the forward movement of a transparent shield 98 (for example, made of "Perspex") against the pressure of a Z-shaped beryllium copper spring 99 which bears, on the one hand, against a terminal 100 extending through the rear wall of the housing and, on the other hand, against a photo-voltaic cell adjacent to the shield 98. A wire 102, brought out through the side wall of the housing, is connected electrically to a strip contact on the front of the cell 101 and the spring 99 connects a rear electrode of the cell to the terminal 100. Other connections are made from the terminals 100 and the wires 102 to the associated tubes, as shown in Fig. 7. In the middle of the supporting ring 90 (Fig. 13) is located a mercury-vapour enclosed fluorescent lamp 103, for example of 3000 lumens. In the rest position of the reeds, the photo-voltaic cells are effectively screened by the shutters 94 from the lamp 103. The photo-cells are disposed in a circle about the lamp as centre and the intensity of illumination at the shutters, which work closely adjacent to the cells, is therefore approximately the same in each case. This arrangement facilitates the adjustment of the reeds.

The application of the invention to an electrophysiological procedure, such as electro-encephalography, calls for the provision of a suitable amplifier and recording system. Fig. 10 is a circuit diagram of an amplifier suitable for electro-encephalography and a description of the circuit and the values of the components therein may be found in the Journal of the Institution of Electrical Engineers, vol. 90, part III, No. 11, September 1943, p. 129. Essentially the amplifier consists of a battery-driven, balance differential stage and pre-amplifier 104 working into a mains driven voltage amplifier 105. Power supplies for the amplifier 105 are taken from a voltage-stabilised power unit 106. The amplification of the pre-amplifier 104 is about 500 and its discrimination against unwanted in-phase inputs is of the order of 100:1. The voltage amplifier 105 has an overall amplification of about 10,000 so that the amplification from input to output is of the order of $5 \times 10^6$. A change of potential across the input terminals of 10 micro-volts thus appears at the output as a change of 50 volts. The time-constants of the coupling circuits are so chosen that the overall time-constant is of the order of one second. In Fig. 10, the output is taken from a terminal 107 to the input terminal 107a of a power amplifier, the circuit diagram of which is shown in Fig. 11. The terminal 107a leads through a suitable condenser to the grid of tube 109, which may conveniently be a power triode of the 10 watt class, such as the Mazda PP5/400 or a power tetrode, such as the 6L6. The anode of tube 109 is fed through a resistance 111 from the positive side of a power source 112. A similar tube 110 is also fed from the same source through a similar resistance 111a. Across the anodes of these tubes is connected a potentiometer 113, the moving contact of which is connected through a condenser 114 to the grid of tube 110. The potentiometer 113 is so adjusted that a small proportion of the output from tube 109 is returned to the grid of tube 110. This output is 180° out-of-phase with the potential on the grid of tube 109, so that the grid of tube 110 is driven out-of-phase with the grid of tube 109. With the potentiometer 113 correctly adjusted, the two tubes 109, 110 act in push-pull, the circuit being a form of the so-called "Paraphrase." Across the anodes of tubes 109 and 110 is connected the coil 115 of a moving coil recording oscillograph. For maximum efficiency the resistance to the coil 115 should be equal to the value of the resistances 111 and 111a and these resistances should also be equal to the effective resistance of the tubes 109 and 110. In the present arrangement these resistances are all 2500 ohms. It will be realised that in the amplification of potential changes in the frequency band around one C. P. S., no transformer coupling of economic dimensions can be used so that the coil 115 must actually be wound to a resistance of about 2500 ohms. In order to keep the coil 115 reasonably light, and the frequency response of the recording oscillograph reasonably extended, the coil 115 must be wound with very fine wire, which cannot carry safely the anode current of a power tube of the kind referred to. Since, however, the anodes of the tubes 109 and 110 are at the same potential when no signal is being applied, no direct current flows through the coil 115. When, for example, the grid of tube 109 is driven positive by a signal, its anode current rises and its anode potential becomes less positive by an amount depending upon the amplification factor of the tube. Simultaneously, the grid of tube 110 is driven less positive through the circuit of potentiometer 113 and condenser 114. Accordingly, the anode current of tube 110 falls and the anode potential rises by the same amount as that of tube 109 falls. A potential difference therefore appears between the two anodes and current flows through the coil 115, so that the oscillograph is deflected.

Fig. 11A shows a simpler way of employing the circuit of Fig. 11, when a moving-iron recorder is used. Since the driving coils of such a recorder are not required to move, they can be wound with thicker wire which can carry the anode current of tubes 109 and 110. These coils, which are indicated in the drawing at 116, 116a, are connected in the circuit of Fig. 11 in place of the resistances 111, 111a, and are wound so that the resistance of each coil matches the resistance of the tube driving it; again 2500 ohms. The potentiometer 113 and the condenser 114 are connected, as before, across the anodes of the tubes. In this case, when the anode current of tube 109 rises, that of tube 110 falls so that the magnetic field in coil 116 rises and that in coil 116a falls. The coils 116 and 116a are connected in such a sense that the magnetic fields due to the resting anode currents are opposed, so that the armature 117 rests midway between the poles of permanent magnets (not shown). When the anode currents change, as described above, the said balance of the armature is upset and the armature 117 is attracted to the poles of the magnets, thus deflecting the recording point. The advantage of the moving iron system is that its electrical efficiency is twice as great as that of the moving coil arrangement, but its magnetic efficiency is somewhat less.

Returning now to the immediate subject of the invention, Fig. 12 shows the circuit diagram of a conventional push-pull amplifier suitable for driving the various wave-form analysing devices in accordance with the invention. The amplifier has input terminals 120, 121 which may be connected directly to the anodes of the tubes 109, 110 of Fig. 11 via terminals 118 and 119. If, however, the voltage output from these tubes is too great for the grid-base of tubes 122 and 123 of the amplifier, a simple balanced attenuator circuit (not shown) may be used to reduce the input to the amplifier. The tubes 122, 123 receive exactly the same signal as the recorder of Fig. 11 or 11A and their anodes are fed through resistances 124 and 125 from a power source 126. Across the tube anodes are connected in series the driving solenoids 4a, 4b ... 4x of the frequency-sensitive devices described earlier. In one embodiment of the invention described with reference to Figs. 7 and 13, there are twelve such solenoids each having a resistance of 200 ohms so that the resistance of the whole series matches that of the driving circuit. The current fluctuations in the solenoids follow the incoming signal and each of the frequency-sensitive devices receives an equal share of the power so generated, selecting from it the frequency components to which it is tuned.

To recapitulate the operation of the whole system; a signal appearing as a change of potential across the input terminals 127 and 128 of the amplifier 104 of Fig. 10 is amplified up to 5 million times by the amplifiers 104, 105 and is then passed to the amplifier of Fig. 11 where the potential change causes a change in anode current of the tubes 109, 110. This current change deflects the electro-magnetic recording oscillograph through the coil 115 or the coils 116, 116a (Fig. 11A) and at the same time provides the tubes 122, 123 (Fig. 12) with a signal which changes their anode current and thus energises the frequency-sensitive devices associated with the energising solenoids 4a etc.

In most applications to electrophysiology, and especially in electro-encephalography, more than one recording channel is necessary. In the latter case, the source of a potential change in the brain can be accurately located only by observing the phase relations of the change in a number of channels recording simultaneously and connected to different parts of the head in a systematic arrangement. Such arrangements are discussed in the paper referred to above.

Fig. 14 is a block diagram showing how a four channel amplifying and recording equipment may be combined with the analyzing apparatus described. In Fig. 14 pairs of leads 129, 130; 129a, 130a; ... 130c are connected from the subject to a calibrator which may consist of a source of low potential driving a small current of the order of a few microamperes through a low resistance of the order of one ohm, thus providing a voltage of the order of microvolts which may be applied by a switch to one or all of the amplifying channels. By this means the amplification of the several channels may be adjusted to equality or to any desired ratio, and at the same time the time constants and frequency response of the amplifiers may be checked by inspection of the tracing produced when a small square waveform is injected into the inputs. From the calibrator the leads pass to the input terminals 127, 128; 127a, 128a; ... 128c of the four channels respectively and thence to the pre-amplifiers each of which is similar to that of 104 (Fig. 10). The low and high tension supplies for this part of all four channels may be common, as indicated. From the amplifiers the signals pass to the voltage amplifiers, exemplified by the amplifiers 105 of Fig. 10. At this stage all channels can share a common power supply. After amplification, the signals pass to the power amplifiers, which are as shown in Fig. 11, and thence to drive the recorders 115 ... 115c. As described in connection with Fig. 11, the outputs from the power amplifiers are connetced in parallel with terminals or contacts 118, 119; 118a, 119a; 118b, 119b and 118c, 119c which are arranged for connection via switches 131, 132 to the input terminals 120, 121 of the analyser power amplifier, which is shown in Fig. 12.

The swtiches 131, 132 are so arranged that the input to the analyser power amplifier may be connected as described to any one of the outputs, such as 118 and 119 or 118c and 119c from any one of the power amplifiers of the four channels, or may alternatively be connected to two channels simultaneously, such as to 118 and 118a or 118b and 118c.

From the power amplifiers the signals pass to the analyser proper, which is as shown in Fig. 3, or Fig. 5, or Fig. 7 and from this the series of analysis pulses are conveyed to the power amplifier for the recording oscillograph, which is shown in Figs. 3, 8 or 9. As indicated in Fig. 14, the recorder 48 is displaced along the recording surface for such a distance as to ensure that the analysis is traced over the primary record to which it refers, such primary record being produced by the recorders 115, 115a, 115b or 115c.

In the position shown in Fig. 14, the switches 131, 132 are connecting the analyser to the first channel. It is possible to arrange a third switch for conjoint operation with the switches 131, 132 and to connect its contacts across sections of the resistance 78 (Fig. 7) so that the grid bias on the tube 46 of Fig. 3 or Fig. 8 or Fig. 9 is varied according to the position of switches 131, 132. In this way, when any channel is selected for analysis the recording point of the oscillograph 48 may be moved across the recording surfaces so as to trace the analysis not only in correct time relation to the primary record, but also directly alongside it. The amplitude of the analysis trace must, in such a case, be kept smaller since only the space between the primary traces can be used instead of the whole width of the recording surface.

As mentioned above, it is often important in electroencephalography, to be able to discern the phase relations in two channels of the various components of a complex wave-form. Frequently one component is in phase in two channels while another component is out of phase in the same two channels. This is because the two components do not originate in the same place. Even greater complication occurs when there are several frequency components each of them originating in a different place and thus appearing in various phase relations in the several channels. Precise interpretation of such a record is often of great importance, but it is impossible by direct inspection. Fig. 15 shows diagrammatically how the analyser may be used to discriminate in-phase and out-of-phase components in two channels.

Assume that two channels of the system shown in Fig. 14, Channel I and Channel II, are so connected to the leads 129, 130 and 129a, 130a, respectively, that an alternating voltage from the brain of a subject, or other source, appears in the out-put power stages of the two channels as the wave-form indicated by solid lines 133 and 133a (Fig. 15) drawn across the grid and anode leads of tubes 109, 110 and 109a, 110a, in the two channels, respectively. Then, when the terminals 120, 121 are connected by the switches 131, 132 to terminals 118, 119 of Channel I, the analyser will be operated by the wave-form 137, 138 (solid line) which, being fed out of phase to the tubes 122, 123 produces a relatively large current change through the coils 4a, 4b etc. of the frequency-sensitive devices. The final analysis therefore shows a relatively large energy content at the frequency of this wave-form. This is the straight-forward analysis of a single channel. Assume now that the switch 132 is operated to connect the terminal 121 to terminal 118a in Channel II (instead of to terminal 119 in Channel I, as before). Valve 123 is now driven by wave 133a, instead of 134. But it will be seen that wave 133a is indistinguishable from wave 134. The analysis will, therefore, be exactly the same as if the analyser and amplifier were connected to Channel I alone. Again, if the switches 131, 132 are operated to connect terminal 120 to terminal 118a and terminal 121 to terminal 119a, the analysis will be of Channel II alone and again will be exactly the same as the other two.

Now suppose that instead of the wave being out of phase in the two channels, it is in phase in both. This condition is represented by the dotted-line wave 135 in Channel I. When the analyser is connected to Channel I alone the analysis will be the same as before. When, however, the second method of connection is used (i. e. 120 connected to 118 and 121 connected to 118a) tube 122 will be operated by wave-form 139 (dotted) and tube 123 by wave-form 138 (solid). These two waves are in phase and therefore the anode voltages of the tubes 122, 123 will rise and fall together; no potential difference will then develop across solenoids 4a, 4b, etc., the frequency-sensitive devices will not be energised and no analysis will appear.

If now it is supposed that the incoming wave-form contains a component which is in phase in the two channels, as well as one at another frequency which is out of phase in the same two channels, analysis of each channel separately will show the energy content at both frequencies, but the phase discriminating connections as above can reveal in the analysis only the component which is out of phase in both channels.

Conversely by connecting terminal 121 to terminal 119a, when terminal 120 is connected to terminal 118, the analyser may be made sensitive only to components which are in phase in the two channels.

The operation of this circuit is made even more completely phase-discriminatory by a cathode resistor 140 (Fig. 12) which is un-bypassed and being common to both the tubes 122 and 123, provides degeneration when the anode current changes in the same sense in the two tubes, but no degeneration when the anode current changes are exactly out of phase with one another, since in this case there is no net change in cathode current.

Referring again to Fig. 7, it will be realised that the precise adjustment and calibration of the reeds 3a to 3x with regard to their tuning and damping factor may be a matter of some difficulty unless means is provided to record the excursion of the shutters 70a to 70x in relation to the photo-voltaic cells 71a to 71x. The arrangement of Fig. 16 is provided, inter alia, for this purpose. As will be seen, Fig. 16 is part of the circuit of Fig. 7 showing only the connections of the photo-voltaic cells 71a to 71x to the control grids of the tubes 72a to 72x and to the common cathode line. For purposes of calibration and adjustment each cell 71 has, in addition, a high resistance 141a to 141x connected, as appropriate, to the same terminal as is the grid of the associated tube. The other ends of these resistances are commoned and connected to a condenser 142 and thence to a terminal 145. The resistances 141a to 141x have a value of about 2 megohms and the condenser 142 has a capacity of 4 µf. A further resistance 144 of 2 megohms is connected to the common cathode line, and a further condenser 143 (4 µf.) leads from this to a terminal 146. The terminals 145, 146 accordingly provide an output for the whole series of cells 71a to 71x and, since the resistances 141a to 141x are all very much larger than the internal resistances of the cells, the common connection of the cells through the high resistances does not prevent the potential on the grid of each of the tubes 72a to 72x from being individually determined by the voltage generated by each of the cells 71a to 71x. If now the terminals 145, 146 are connected to an amplifier and recorder, a tracing may be made of the voltage output of any single cell or group of cells or of all the cells together. Since the light falling on any single cell is determined by the position of the shutter with which it is associated, a tracing obtained from the system in the manner described will be record of the characteristics of vibration of the shutter and reed associated with the cell. Thus, the natural frequency of vibration and the logarithmic decrement of each reed may be directly recorded and, if necessary, adjustments may be made. Moreover, the record so obtained may be stored as a record of performance against which the apparatus may be standardised after long use or rough handling. A suitable amplifier and recorder for the above purpose is the voltage amplifier 105 of Fig. 10 and the power amplifier and recorder of Fig. 11. When a multi-channel system is used, the input to the analyser may be recorded as a primary record on one channel and the output from the photo-cells as a secondary record on another channel so that the two may be directly compared. Additional switches (not shown in Fig. 10) may be provided to enable any single reed-shutter-photo-cell system to be studied separately. These switches may be connected between each of the resistances 141a to 141x and the common lead to the condenser 142. When used in this way, the output from the terminals 145, 146 may be used to study the momentary fluctuations in any selected frequency component of a complex wave-form, at the same time as the primary trace and complete analysis are being recorded.

It should be noted that if the shutters of the photo-cells just cover the cell windows in the rest position, without extending outside the boundary of the cell housing, then each photo-cell will be exposed by the shutters at each half cycle of operation. The frequency of the reconstituted wave as led off from terminals 145, 146 will then be double the frequency of the wave energising the reed. In order to check the operation of the whole frequency discriminating and photo-electric assembly, a complex wave-form may be recorded by one channel of the equipment in Fig. 14 and this may at the same time be analysed and reconstituted by connecting another channel to the terminals 145, 146. The reconstituted wave-form should bear a reasonably close resemblance to the original one except for the frequency doubling effect mentioned above.

Figs. 17A, 17B and 17C are three examples of the application of the invention to specific problems. These records have been published in Electronic Engineering, November, 1943. All were taken with the equipment as described with reference to Fig. 14.

Fig. 17A is a four-channel electro-encephalogram from a normal subject. Channel I, the topmost, is from the right side of the head, Channel II is from the left side, both leading from the back, Channel III is from the front of the head and next down is the analysis of Channel I. Channel IV is the electro-cardiogram, recorded simultaneously; the potentials generated by the heart. The analysis shown in Fig. 17A was made with the embodiment of the invention described with reference to Fig. 3 (in which only 18 reed frequencies were included) and utilising the ten-second storage registers 16a to 16r and 17a to 17r. Following the analysis from left to right there are first, two small downward deflections due to the contact arm of switch 27 (Fig. 3) passing over the contacts 35b and 35a. These mark the beginning of the epoch and indicate the beginning of that part of the primary record of Channel I to which the analysis applies. Next, there is a small upward deflection. This indicates a small amount of energy at 6 C. P. S. There is then a small downward deflection, which is due to the spacing contacts 36, which separates the "abnormal" low frequency band from the normal band of frequencies. After this there are six large upward deflections indicating the energy at 8, 9, 10, 11, 12 and 13 C. P. S. The dominant frequency is seen to be at 10 C. P. S. with a wide spread into the adjacent bands. This spread is due partly to fluctuations in frequency of the rhythm and partly to amplitude modulation of the rhythm producing side-bands on both sides of the fundamental frequency. After this band there is another downward deflection due to contact 37 dividing the normal from the "abnormal" high frequency bands. There is then a smaller peak of energy at 20 C. P. S. with smaller peaks at 18 and 22 C. P. S. This indicates the proportion of second harmonic in the fundamental rhythm. This second harmonic content is barely perceptible on inspection of the primary record, even in the original. The next feature is a repetition of the double downward deflections from contacts 35b and 35a, to divide the epoch just described from the next one. During this epoch the subject was given a problem to solve. The change in the rhythm is seen to be a diminution of amplitude and a rise in dominant frequency to 12 C. P. S. together with a drop in second harmonic content. This finding is invariable during mental exertion with this type of subject.

As a contrast, the record of Fig. 17B is from a case of minor epilepsy or petit mal. Again the analysis applies to the top channel. The distribution of frequencies is seen to be quite different from the normal record, showing peaks of energy at 3, 4, 7, 9, 10, 12, 13, 14, 18 and 22 C. P. S. In the first epoch the dominant frequencies are 3, 9, and 12 C. P. S. suggesting that if 3 C. P. S. is the fundamental in this case, the others are third and fourth harmonics. Similar spectra have been obtained from other cases of the same type and the wave-form characteristic of the condition has been synthesised from pure sine waves containing the components revealed by analysis.

The record of Fig. 17C is an example taken from a different branch of study. The primary record in Channel I, the only one in use on this occasion, was derived by way of a crystal microphone applied to the housing of an electric motor and gearbox. The microphone output was amplified by the same means as in the other examples. However, in the present case the recording surface was moved at twice the speed of the former examples and the frequency scale of the analysis is correspondingly spread out. A large number of the components of the vibration are disclosed, the lowest being at 3 C. P. S. and the widest spread of frequency being in the 8–16 C. P. S. band. By the aid of this analysis it was possible to show which part of the motor assembly under examination was responsible for each of the peaks, which could be eliminated in turn by adjustment of various parts of the mountings and bearings.

Fig. 18 shows a frequency selective and integrating unit comprising an electronic circuit, a plurality of which circuits may be used in place of the tuned mechanical frequency-sensitive devices and storage-register units previously described. In the arrangement of Fig. 18 an electron tube is used in the frequency selective section of the unit and the frequency spectrum from which the required frequency or frequency band is to be selected is applied to a control electrode of the tube which is provided with a feed-back circuit containing a combination of capacity and resistance arranged to obtain a phase-shift at the selected frequency or band of 180° between said control electrode and another electrode of the tube, so that the arrangement is selective to the required frequency or frequency band, a potentiometer resistance also being provided for controlling the amount of feed-back and for adjusting the selectivity of the circuit.

More particularly, a pentode tube 171a is associated with a phase-shifting network, consisting of condensers $C_1$, $C_2$ and $C_3$, fixed resistors $R_2$, $R_3$, $R_4$, variable resistor $R_8$, fixed resistor $R_5$, potentiometer $R_7$ and fixed resistor $R_6$, to act as a frequency-selective device, which is variable in frequency response and in selectivity. The condensers $C_1$, $C_2$, $C_3$ may be substantially equal in capacity and the resistor net work may be such that the resistor combinations $(R_2+R_3)$, $(R_4+R_8)$, $(R_5+R_7+R_6)$ are substantially equal.

The cathode lead of tube 171a carries a bias resistor $R_9$ connected to a power supply voltage source at zero volts, as shown. A small fixed negative bias voltage is applied to the control grid of tube 171a from the voltage source via a potentiometer $R_1$, which is connected across input terminals 173 and through a series resistor $R_{10}$ in the lead to the control grid. The anode of tube 171a is connected via a fixed resistor $R_{13}$ to a terminal 174 of the voltage source as shown. The cathode resistor $R_9$ and the small fixed bias together provide some negative feed-back tending to stabilise the tube characteristics and to minimise distortion, with less reduction in tube gain than would result from the use of a bias resistor alone providing the same mean bias.

The phase-shift voltage from the network is fed back to the control grid of tube 171a through a connection from the slider of potentiometer $R_7$ and, at one frequency only, the network will produce a phase-shift of 180° between the anode and grid voltages at which frequency sustained oscillations will be set up in the circuit provided the gain is sufficient to overcome the attenuation in the network. By adjustment of the potentiometer $R_7$, the amount of feed-back can be controlled to the point at which the system does not oscillate but acts to amplify a component of an input signal applied across the terminals 173 which is pre-determined by the constants of the phase-shift network. In this nonoscillating condition the bandwidth of the system is also controllable through the potentiometer $R_7$.

The mean frequency of the said pre-determined component favoured by the foregoing arrangement is given, approximately, by the expression:

$$\frac{1}{2\pi\sqrt{6RC}} \text{ cycles/second}$$

where
$$C = C_1 = C_2 = C_3$$
and
$$R = (R_2+R_3) = (R_4+R_8) = (R_5+R_6+R_7)$$

approximately.

The exact values of resistance and capacity for any given component of frequency may readily be determined empirically. The frequency response of the circuit may be varied within fine limits by means of the variable resistor $R_8$, which is provided for use as a preset fine control.

The output from the phase-shift network is taken from the junction of resistors $R_2$ and $R_3$ and to avoid a change in impedance of any of the components on loading the network, resistor $R_3$ is made low in value (for example, one-tenth) as compared with resistor $R_2$. The potentiometer $R_1$ is adjustable to vary the signal level at the control grid of tube 171a and the fixed resistor $R_{10}$, which is relatively high in value (e. g. 2 megohms) prevents change of operating frequency of the tube and associated network when the signal level is varied.

As in the previous arrangements, the output from the frequency-selective section is taken to an integrating circuit, which in the present embodiment is effected by connecting the junction of resistors $R_2$ and $R_3$ to the control grid of a pentode tube 172a having its anode connected to a change-over switch 176a leading to alternative storage condensers 177a and 178a. The plates of the condensers 177a, 178a remote from the tube 172a are joined to terminal 174 of the power supply voltage source. Leads 179a, 180a from the condensers 177a, 178a are provided for connecting the latter to the contacts of a rotary selector switch (not shown) as in the previous arrangements.

Bias for the tube 172a is derived from a cathode resistor $R_{11}$ which bias, in conjunction with a suitable low voltage applied to the screen of the tube through a potentiometer $R_{12}$ connected across a section of the power supply voltage source, maintains the space current of the tube close to zero in the absence of a positive input signal. When, however, the control grid of tube 172a is driven positive from the phase-shift network, the anode current of the tube fluctuates and a charge is built up in condenser 177a or 178a (according to the position of switch 176a) which is proportional, over a given period of time, to the amplitude of the frequency or frequency band selected by the phase-shift circuit.

To assist in calibration of the circuit a high value resistor $R_{14}$ is connected between the junction of resistors $R_2$ and $R_3$ and a test output terminal 186.

Tube 172a may conveniently comprise an EF.50 in which case $R_{11}$ may have a value of 2,000 ohms, $R_9$ a value of 20,000 ohms being connected across a potential difference of 20 volts on the power supply voltage source and terminal 174 may stand at a potential of 140 volts. Voltage taps 181 and 185 are provided on the power supply voltage source corresponding to the taps 81 and 85 of Fig. 7.

It will be seen that tube 171a with its associated phase-shift network constitutes an electronic analogue to the tuned mechanical frequency-sensitive devices 4a, 3a (Fig. 3), 4a, 52a (Fig. 5) and 4a, 71a (Fig. 7) described previously. The tube 172a functions in a manner similar to tube 72a of Fig. 7 to integrate the amplified frequency or frequency band selected by tube 172a and the associated network.

A plurality of the frequency-sensitive and integrating circuit-units of Fig. 18 may be used in combination to replace the mechanical resonator and integrator units in the arrangements previously described with reference to Figs. 3, 5 and 7 of the drawings, any necessary circuit changes being made as will be apparent to those skilled in the art.

Such a combinational arrangement of the circuit units of Fig. 18 is shown in Fig. 19 in which three circuit-units designated by blocks 188a, 188b and 188x with associated potentiometers $R_1a$, $R_1b$ and $R_1x$ and grid resistors $R_{10}a$, $R_{10}b$ and $R_{10}x$ are connected in parallel to signal input terminals 224, 225. The arrangement of Fig. 19 corresponds generally with that of Fig. 7 in that pairs of leads (179a, 180a), (179b, 180b) and (179x, 180x) from the units 188a, 188b, 188x are joined respectively to pairs of contacts (238a, 234a), (238b, 234b), (238x, 234x) of a rotary selector switch 227 carrying contact arms 228 and 231 which are each in electrical connection with a slip-ring 243 against which bears a contact-brush 244 connected to an output terminal 279. The first and last pairs of contacts 235a and 235b of the switch are joined and are connected, as shown, through a switch 280a to a lead 281 which is provided for connection to terminal 181 of the power supply voltage source shown in Fig. 18. An output terminal 274 is also provided for connection inter-alia to the terminal 174 of Fig. 18. Intermediate contacts are provided on the rotary switch 227, as in Fig. 3, to provide frequency scale division markers, while contacts 235a and 235b mark the beginning and end of the scanning epochs. A terminal 285 is also provided for connection to terminal 185 of Fig. 18.

Terminals 224, 225 are equivalent to the input terminals 24, 25 of Fig. 7 and may be connected from terminal 126 across resistor 124 or 125 of the amplifier shown in Fig. 12, the driving solenoids 4a, 4b ... 4x of that figure being then disconnected.

As in the arrangement of Fig. 7, the circuit of Fig. 19 is such that the plates of the storage condensers of units 188a, 188b ... 188x connected to the contacts 234a, 238a, etc. acquire negative charges and it is, therefore, necessary to provide that the pulses, as effective at the grid of the tube driving the recording oscillograph, are inverted. The circuits of Figs. 8 and 9 provided to this end in connection with the circuit of Fig. 7 are also effective with the arrangement of Fig. 19. Thus, the circuit of Fig. 19 may be used with that of Figs. 8 and 9 by connecting terminals 74a, 79a and lead 84 of the latter figure to terminals 274, 179 and 285 respectively of Fig. 19. Switch 280a is left open, when using the circuit of Fig. 8, the marking and beginning and end pulses then being derived from the separate scanning arm 87 (Fig. 8) as previously described. When using the circuit of Fig. 9, switch 280a is closed and the marking and epoch pulses are derived from contacts 235a, 235b and the intermediate contacts as will readily be understood.

The setting up and calibration of the arrangement of Fig. 19 may be effected by connecting a low frequency oscillator to the input terminals 224, 225, the test-output terminals 186 of each of the units 188a, etc. being joined via a multi-way switch to the input of an amplifier feeding an ink-writing oscillograph, so that the performance of each unit can be studied.

The frequency and the selectivity of the unit under consideration are then adjusted in turn by means of the controls $R_8$ and $R_7$ respectively, and finally the gains in each unit are adjusted to equality by means of the potentiometer $R_1a$, $R_1b$, etc. The selectivity of each unit can be checked either by direct measurement of the response at different frequencies or by calculation from the time constant of decay of oscillations as seen on the record.

The integrator tubes 172a are adjusted by connecting a microammeter from the anode to the terminal 174 and with no signal input the current through the microammeter is adjusted to 1 $\mu$A, by means of control $R_{12}$.

While several preferred embodiments of the invention have been described, various modifications may be made, for instance as follows:

In the circuit of Fig. 3 the duration of contact is determined by the time the wires 6a etc. make contact with the mercury. An equivalent result may, however, be secured using light flexible springs which, under the action of the reeds, make or break an electrical contact for times determined by the amplitude of vibration of the reeds.

Further, in place of (or in addition to) the recording oscillograph 48 it may be desirable to arrange that the analysis be displayed on a cathode ray oscilloscope. In such a case, a cathode ray oscilloscope of long afterglow period is preferably employed so arranged that its time-base circuit is synchronised with the transmissions from the storage-registers via the read-out means, the deflections on the co-ordinate axis of the tube being controlled by the analysis pulses. By this means a histogram of the energy distribution in the desired frequencies of the wave-form being analysed may be displayed at each epoch on the tube in the same position whereby visual appreciation of the differences between successive spectra is facilitated.

In the arrangements described, the storage-register condensers gain either positive or negative electrical charges under the control of the frequency-sensitive devices. Alternatively, the condenser units could be charged to a predetermined level at the commencement of each epoch and the frequency-sensitive devices arranged to discharge the condensers, the extent of discharge then providing the measure of the data accumulated by the register units and of the energy at the various frequencies. The circuit modifications for such an arrangement should be apparent to one skilled in the art and will not therefore be described.

While the use of a single recording device, such as the recorder 48, involves transmitting the analysis pulses in succession, the invention is not limited to such an arrangement. Thus, as an alternative, multiple recording devices could be employed, one for each of the frequencies concerned, and the successive read-out means be replaced by a multiple-contact switch arranged to bring about simultaneous energisation of each recording device.

In the embodiment of Fig. 18 tubes 171a and 172a may be replaced by an electron-coupled circuit comprising a single multi-grid tube having its anode connected to switch 176a and the phase-shifting circuit lead from condenser $C_1$ connected to a second grid in the known manner to produce electron-coupling between the frequency-selective portion of the tube and the output circuit portion.

Numerous additional applications of the principles above-disclosed in the embodiments shown will occur to those skilled in the art and no attempt has been made to exhaust such possibilities. The scope of this invention is defined in the following claims.

What is claimed is:

1. In apparatus of the class described for analysing wave-forms, the combination of a frequency-sensitive device responsive only to a given frequency in the wave-form under analysis, a timer operative over a predetermined time intervals, an independent circuit connected to and under control of said frequency-sensitive device and of said timer and including a storage unit to store and integrate the controlled energy of the independent circuit over said predetermined time interval, whereby the amount of energy stored and integrated over the predetermined time interval is proportional to the amount of the given frequency in the waveform under analysis, and an indicator connected to said storage unit to provide a quantitative indication of the content of the storage unit and hence of the amount of the given frequency in the wave form under analysis.

2. Apparatus according to claim 1 wherein the frequency-sensitive device comprises a lightly damped magnetically operated reed tuned to resonate at the given frequency, a solenoid for operating said reed, a thermionic tube having an anode, a photo-voltaic cell associated with the reed and connected to said tube to control the anode current through the tube in accordance with the quantity of light falling upon the cell, and means under the control of said reed for varying the quantity of light incident upon the cell in accordance with the duration and amplitude of vibration of the reed.

3. Apparatus according to claim 2 wherein the thermionic tube is of the multi-grid type including a control grid, a second grid, and a cathode, said control grid being connected to said photo-voltaic cell to render said control grid positive with respect to its cathode when the cell is illuminated and said second grid being biased to produce minimum anode current in the tube with minimum illumination of the cell.

4. Apparatus according to claim 1 wherein there are at least two storage units and a selective control connected to and under control of said timer is provided for selectively connecting the frequency-sensitive device and the indicator each to a different storage unit so that the integrated content of one storage unit is transmitted to the indicator at a time during which energy is being stored and integrated in another such unit.

5. In apparatus of the class described for analysing wave-forms, the combination of a plurality of frequency-sensitive devices, each responsive only to a different frequency in the wave-form to be analysed, a timer operative over predetermined time intervals, a plurality of independent circuits, each associated with a different one of said frequency-sensitive devices and connected to and under control of its associated frequency-sensitive device and of said timer and including a storage unit to store and integrate the controlled energy of the independent circuit over a predetermined time interval of said timer whereby the amount of energy stored and integrated in each storage unit over the predetermined time interval is proportional to the amount of the frequency in the wave-form under analysis to which the associated frequency-sensitive device is responsive, and an indicator connected to said storage units to provide a quantitative indication of the contents of the storage units and hence of the amounts of each different frequency in the wave form under analysis.

6. Apparatus according to claim 5 wherein there are at least two storage units for each independent circuit and a selective control connected to and under control of said timer is provided for selectively connecting the different storage units of each independent circuit to the associated frequency-sensitive device and the indicator alternately so that the integrated content of one storage unit of each independent circuit is transmitted to the indicator at a time during which energy is being stored and integrated in another such unit of the same independent circuit.

7. Apparatus according to claim 6 wherein the connection between said indicator and said storage units comprises a rotary switch mechanism having electrical contacts arranged in a plurality of banks corresponding to the number of storage units employed in each independent circuit and a contact member arranged to scan successively the contacts of the banks, and wherein similar poles of the storage units are electrically connected each to a contact in a bank so that the contacts in the bank are scanned by the contact member in sequence to connect selectively the different storage units to the indicator.

8. Apparatus according to claim 7 wherein said selective control connected between each frequency-sensitive device and its associated storage units comprises a switch operable automatically under control of said timer to connect and disconnect the frequency-sensitive device and its associated storage units in cyclic rotation and the operation of the rotary switch is interlocked therewith so that the contact banks are scanned-out to the indicator only while the related storage units are disconnected from their respective frequency-sensitive devices.

9. Apparatus according to claim 8 wherein each storage unit comprises a capacitance arranged to be electrically charged from an independent source under the control of its associated frequency-sensitive device and wherein similar poles of the capacitances comprising the storage units corresponding to the various frequencies are electrically connected in a natural sequence of the frequencies each to a successive contact in a bank, whereby the contacts in the bank are scanned by the contact member in a natural sequence of the frequencies of the frequency-sensitive devices with which the units are associated.

10. Apparatus according to claim 1 wherein the frequency-sensitive device comprises a lightly damped magnetically operated reed tuned to resonate at the given frequency and a solenoid for operating said reed, and wherein the reed is associated with an electrical contact and carries a contact point arranged to make contact with said electrical contact when the reed is vibrated, whereby the duration of the contact thus established in a cycle of vibration of the reed is a function of its amplitude of vibration and, in an epoch, also of the number of vibrations of the reed.

11. Apparatus according to claim 1 wherein the frequency-sensitive device comprises a lightly damped magnetically operated reed tuned to resonate at the given frequency, a solenoid for operating said reed, a vacuum photo-electric cell, and means under the control of said reed for varying the quantity of light incident upon said cell in accordance with the duration and amplitude of vibration of the reed.

12. Apparatus according to claim 1 including a current source independent of that energizing said frequency-sensitive device wherein the storage unit comprises a capacitance connected to be electrically charged from said independent source under the control of the frequency-sensitive device in an amount which is a function of the sum of the amplitude indications from said device and to be electrically discharged to said indicator.

13. Apparatus according to claim 5 including a current source independent of that energizing said frequency-sensitive devices wherein each storage unit comprises a capacitance connected to be electrically charged from said independent source under the control of its associated frequency-sensitive device in an amount which is a function of the sum of the amplitude indications from said device and to be electrically discharged to said indicator.

14. An electro-encephalograph equipment comprising a low-frequency amplifier and recorder, a frequency-sensitive device responsive only to a given frequency in the wave-form under analysis, a timer operative over a predetermined time interval, an independent circuit under control of said frequency-sensitive device and of said timer and including a storage unit to store and integrate the controlled energy of the independent circuit over said predetermined time interval, whereby the amount of energy stored and integrated over the predetermined time interval is proportional to the amount of the given frequency in the wave-form under analysis, and said storage unit being connected to said recorder through said low-frequency amplifier to provide electro-encephalogram records of the frequency to which said frequency-sensitive device is responsive.

15. An electro-encephalograph equipment comprising a low-frequency amplifier and recorder, a plurality of frequency-sensitive devices, each responsive only to a different frequency in the wave-form to be analysed, a timer operative over predetermined time intervals, a plurality of independent circuits, each associated with a different one of said frequency-sensitive devices and connected to and under control of its associated frequency-sensitive device and of said timer and including a storage unit to store and integrate the controlled energy of the independent circuit over a predetermined time interval of said timer, whereby the amount of energy stored and integrated in each storage unit over the predetermined time interval is proportional to the amount of the frequency in the wave-form under analysis to which the associated frequency-sensitive device is responsive, and said storage units being connected to said recorder through said low-frequency amplifier to provide electro-encephalogram records of the different frequencies to which said frequency-sensitive devices are responsive.

16. Apparatus according to claim 15 in which the primary electro-encephalogram record is traced on a moving record strip and the recorder is positioned to trace the analysed record onto the same strip and over that portion of the strip carrying the primary record from which the analysis is made.

17. Apparatus according to claim 1 wherein the connection between said indicator and said storage unit is under control of said timer.

18. Apparatus according to claim 5 wherein the connection between said indicator and said storage units is under control of said timer.

19. In apparatus of the class described for analysing wave forms, the combination of a frequency-sensitive device responsive only to a given frequency in the wave form under analysis, a current source independent of that energizing said frequency-sensitive device, a storage unit connected to said current source under control of said frequency-sensitive device, whereby the amount of energy stored over a given time interval is proportional to the amount of the given frequency in the wave form under analysis, and an indicator connected to said storage unit to provide a quantitative indication of the content of the storage unit and hence of the amount of the given frequency in the wave form under analysis.

WILLIAM GREY WALTER.

References Cited in the file of this patent
UNITED STATES PATENTS

| Number | Name | Date |
|---|---|---|
| 2,148,578 | Pullis | Feb. 28, 1939 |
| 2,159,790 | Freystedt et al. | May 23, 1939 |
| 2,173,154 | Bernard | Sept. 19, 1939 |
| 2,385,657 | Stettler | Sept. 25, 1945 |
| 2,419,682 | Guillemin, Jr. | Apr. 29, 1947 |